US012688817B2

(12) United States Patent
Lee et al.

(10) Patent No.: US 12,688,817 B2
(45) Date of Patent: Jul. 21, 2026

(54) LIGHT EMITTING DISPLAY PANEL AND LIGHT EMITTING DISPLAY APPARATUS USING THE SAME

(71) Applicant: LG DISPLAY CO., LTD., Seoul (KR)

(72) Inventors: GuenSik Lee, Paju-si (KR); YongWon Jo, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/910,920

(22) Filed: Oct. 9, 2024

(65) Prior Publication Data

US 2025/0140176 A1 May 1, 2025

(30) Foreign Application Priority Data

Oct. 26, 2023 (KR) ........................ 10-2023-0144944

(51) Int. Cl.
*G09G 3/32* (2016.01)

(52) U.S. Cl.
CPC ....... *G09G 3/32* (2013.01); *G09G 2300/0804* (2013.01); *G09G 2300/0819* (2013.01); *G09G 2300/0861* (2013.01); *G09G 2310/08* (2013.01); *G09G 2320/068* (2013.01); *G09G 2330/023* (2013.01); *G09G 2380/10* (2013.01)

(58) Field of Classification Search
CPC ............. G09G 3/32; G09G 2300/0804; G09G 2300/0819; G09G 2300/0861; G09G 2310/08; G09G 2320/068; G09G 2330/023; G09G 2380/10
See application file for complete search history.

(56) References Cited

U.S. PATENT DOCUMENTS 6,593,904 B1 * 7/2003 Marz .................... G09G 3/3648 345/3.1
7,113,159 B2 * 9/2006 Sawabe ................ G09G 3/3648 345/84
7,355,574 B1 * 4/2008 Leon .................... G09G 3/3233 345/82
7,864,172 B2 * 1/2011 Miyake ................ G09G 3/3233 345/212
7,978,167 B2 * 7/2011 Yabuta ................ G02F 1/13471 345/94
7,986,098 B2 * 7/2011 Tada .................... G09G 3/3233 315/307
8,558,829 B2 * 10/2013 Byun .................. G09G 3/3233 345/55
8,786,525 B2 * 7/2014 Mizutani .............. G09G 3/3225 345/204
9,058,782 B2 * 6/2015 Fan ...................... G09G 3/3607
(Continued)

*Primary Examiner* — Michael J Jansen, II
(74) *Attorney, Agent, or Firm* — Birch, Stewart, Kolasch & Birch, LLP

(57) ABSTRACT

A light emitting display panel can include a display area including subpixels and a non-display area outside of the display area, in which each of the subpixels includes a first light emitting unit configured to be driven by a first viewing angle control transistor, and a second light emitting unit configured to be driven by a second viewing angle control transistor. Also, a shape of a first lens included in the first light emitting unit is different than a shape of a second lens included in the second light emitting unit, and a polarity type of the first viewing angle control transistor is different than a polarity type of the second viewing angle control transistor.

21 Claims, 14 Drawing Sheets

(56) References Cited

U.S. PATENT DOCUMENTS

| | | | | | |
|---|---|---|---|---|---|
| 9,214,133 | B2 * | 12/2015 | Chen | G09G 5/02 | |
| 9,236,011 | B2 * | 1/2016 | Mizukoshi | G09G 3/3233 | |
| 9,601,551 | B2 * | 3/2017 | Gu | H10K 59/123 | |
| 9,607,553 | B2 * | 3/2017 | Park | G09G 3/3291 | |
| 9,640,109 | B2 * | 5/2017 | Yang | G09G 3/3225 | |
| 9,966,001 | B2 * | 5/2018 | Gu | G09G 3/3208 | |
| 10,078,979 | B2 * | 9/2018 | Li | G09G 3/3233 | |
| 10,186,192 | B2 * | 1/2019 | Tong | G09G 3/3291 | |
| 10,311,612 | B2 * | 6/2019 | Kamiyoshihara | G09G 3/3611 | |
| 10,354,575 | B2 * | 7/2019 | Yang | G09G 3/3275 | |
| 10,424,250 | B2 * | 9/2019 | Wang | G09G 3/3266 | |
| 10,475,386 | B2 * | 11/2019 | Kim | G09G 3/3233 | |
| 10,528,132 | B1 * | 1/2020 | Hassani | B60K 35/29 | |
| 10,658,605 | B2 * | 5/2020 | Lee | C09K 11/08 | |
| 10,679,556 | B2 * | 6/2020 | Yang | G09G 3/3233 | |
| 10,782,545 | B2 * | 9/2020 | Smith | G02F 1/133603 | |
| 11,073,735 | B2 * | 7/2021 | Harrold | G02F 1/13439 | |
| 11,081,055 | B2 * | 8/2021 | Lee | H10K 59/13 | |
| 11,257,432 | B2 * | 2/2022 | Yuan | G09G 3/2003 | |
| 11,315,509 | B2 * | 4/2022 | Qiao | G09G 3/3614 | |
| 11,378,831 | B2 * | 7/2022 | Heber | B60K 35/29 | |
| 11,562,699 | B2 * | 1/2023 | Park | G09G 3/3233 | |
| 11,636,789 | B2 * | 4/2023 | Dong | G09G 3/3233 | 345/214 |
| 11,670,243 | B2 * | 6/2023 | Woo | G09G 3/32 | 345/204 |
| 11,727,835 | B2 * | 8/2023 | Ha | G09G 3/3258 | 345/204 |
| 11,805,691 | B2 * | 10/2023 | Hong | G09G 3/3266 | |
| 11,817,441 | B2 * | 11/2023 | Liu | H10W 90/00 | |
| 11,854,477 | B2 * | 12/2023 | Gu | G09G 3/3291 | |
| 11,915,646 | B2 * | 2/2024 | Liu | G09G 3/3258 | |
| 11,950,451 | B2 * | 4/2024 | Song | H10K 59/8792 | |
| 11,967,282 | B2 * | 4/2024 | Xu | H10K 59/121 | |
| 11,978,398 | B2 * | 5/2024 | Hong | H10K 59/8791 | |
| 12,004,411 | B2 * | 6/2024 | Hong | H10K 59/8723 | |
| 12,159,591 | B2 * | 12/2024 | Cho | G09G 3/3233 | |
| 12,260,823 | B2 * | 3/2025 | Lee | G09G 3/3233 | |
| 12,315,457 | B2 * | 5/2025 | Hwang | G09G 3/3233 | |
| 12,334,019 | B2 * | 6/2025 | Chung | G09G 3/32 | |
| 12,374,270 | B2 * | 7/2025 | Shin | G09G 3/3233 | |
| 12,482,425 | B2 * | 11/2025 | Kim | G09G 3/3233 | |
| 12,482,430 | B2 * | 11/2025 | Song | G09G 3/3233 | |
| 12,494,173 | B2 * | 12/2025 | Kim | G02F 1/1368 | |
| 12,525,186 | B2 * | 1/2026 | Choi | G09G 3/3233 | |
| 12,538,846 | B2 * | 1/2026 | Ji | G09G 3/32 | |
| 12,567,382 | B2 * | 3/2026 | Kim | G09G 3/3291 | |
| 2003/0146893 | A1 * | 8/2003 | Sawabe | G09G 3/3648 | 345/89 |
| 2007/0070004 | A1 * | 3/2007 | Yabuta | G02F 1/13471 | 345/87 |
| 2007/0080905 | A1 * | 4/2007 | Takahara | G09G 3/3258 | 345/76 |
| 2007/0109481 | A1 * | 5/2007 | Mimura | G02F 1/133504 | 349/143 |
| 2008/0290806 | A1 * | 11/2008 | Tada | G09G 3/3233 | 315/307 |
| 2008/0297055 | A1 * | 12/2008 | Miyake | G09G 3/3233 | 315/169.2 |
| 2011/0157152 | A1 * | 6/2011 | Byun | G09G 3/3233 | 345/76 |
| 2012/0068986 | A1 * | 3/2012 | Mizutani | G09G 3/3225 | 345/211 |
| 2013/0050292 | A1 * | 2/2013 | Mizukoshi | G09G 3/3233 | 345/77 |
| 2013/0109438 | A1 * | 5/2013 | Kwack | G06F 1/1647 | 455/566 |

| | | | | | |
|---|---|---|---|---|---|
| 2014/0035968 | A1 * | 2/2014 | Chen | G09G 5/02 | 345/212 |
| 2014/0192091 | A1 * | 7/2014 | Fan | G09G 3/3607 | 345/89 |
| 2015/0091952 | A1 * | 4/2015 | Wu | G09G 3/20 | 345/88 |
| 2015/0187278 | A1 * | 7/2015 | Park | G09G 3/3291 | 345/212 |
| 2016/0181337 | A1 * | 6/2016 | Gu | H10K 59/123 | 257/40 |
| 2016/0253963 | A1 * | 9/2016 | Yang | G09G 3/3233 | 345/211 |
| 2017/0032556 | A1 * | 2/2017 | Kamiyoshihara | G09G 3/3611 | |
| 2017/0032736 | A1 * | 2/2017 | Gu | G09G 3/3208 | |
| 2017/0200412 | A1 * | 7/2017 | Gu | G09G 3/3266 | |
| 2017/0229056 | A1 * | 8/2017 | Li | G09G 3/3233 | |
| 2018/0082625 | A1 * | 3/2018 | Yang | G09G 3/3233 | |
| 2018/0226019 | A1 * | 8/2018 | Tong | G09G 3/3291 | |
| 2018/0293963 | A1 * | 10/2018 | Kim | B60W 50/00 | |
| 2019/0005883 | A1 * | 1/2019 | Kim | G09G 3/3233 | |
| 2019/0081261 | A1 * | 3/2019 | Lee | H10H 20/813 | |
| 2019/0228709 | A1 * | 7/2019 | Wang | H10K 59/131 | |
| 2019/0325823 | A1 * | 10/2019 | Yang | G09G 3/3233 | |
| 2019/0353943 | A1 * | 11/2019 | Smith | G02F 1/133528 | |
| 2020/0012342 | A1 * | 1/2020 | Hassani | G06F 3/013 | |
| 2020/0026114 | A1 * | 1/2020 | Harrold | G02F 1/13475 | |
| 2020/0225698 | A1 * | 7/2020 | Liang | G06F 1/1675 | |
| 2021/0020106 | A1 * | 1/2021 | Lee | H10K 59/13 | |
| 2021/0201787 | A1 * | 7/2021 | Yuan | G09G 3/3291 | |
| 2021/0223583 | A1 * | 7/2021 | Heber | B60K 35/00 | |
| 2021/0350757 | A1 * | 11/2021 | Qiao | G09G 3/3648 | |
| 2021/0358401 | A1 * | 11/2021 | Liu | G09G 3/2003 | |
| 2022/0076602 | A1 * | 3/2022 | Dong | G09G 3/3225 | |
| 2022/0139332 | A1 * | 5/2022 | Park | G09G 3/3283 | 345/214 |
| 2022/0157258 | A1 * | 5/2022 | Woo | G09G 3/3275 | |
| 2022/0270528 | A1 * | 8/2022 | Ha | G09G 3/006 | |
| 2022/0351681 | A1 * | 11/2022 | Liu | H10K 59/123 | |
| 2023/0215357 | A1 * | 7/2023 | Hong | H10K 59/40 | 345/174 |
| 2023/0217690 | A1 * | 7/2023 | Hong | H10K 59/353 | 345/173 |
| 2023/0217691 | A1 * | 7/2023 | Song | G06F 3/0412 | 345/173 |
| 2023/0217763 | A1 * | 7/2023 | Hong | G09G 3/3258 | |
| 2023/0317695 | A1 * | 10/2023 | Liu | H10H 29/142 | |
| 2024/0005873 | A1 * | 1/2024 | Kim | G09G 3/3266 | |
| 2024/0087524 | A1 * | 3/2024 | Xu | G09G 3/3233 | |
| 2024/0127755 | A1 * | 4/2024 | Chung | G09G 3/3266 | |
| 2024/0127760 | A1 * | 4/2024 | Cho | B60K 35/60 | |
| 2024/0153459 | A1 * | 5/2024 | Chun | G09G 3/3233 | |
| 2024/0178198 | A1 * | 5/2024 | Ji | H10H 20/855 | |
| 2024/0196649 | A1 * | 6/2024 | Song | H10K 59/121 | |
| 2024/0212617 | A1 * | 6/2024 | Lee | G09G 3/3233 | |
| 2024/0257719 | A1 * | 8/2024 | Shin | G09G 3/3233 | |
| 2024/0257769 | A1 * | 8/2024 | Kim | H10K 59/879 | |
| 2024/0260423 | A1 * | 8/2024 | Kang | G09G 3/3233 | |
| 2024/0260424 | A1 * | 8/2024 | Mun | H10K 59/1216 | |
| 2024/0265881 | A1 * | 8/2024 | Song | G09G 3/3233 | |
| 2024/0271953 | A1 * | 8/2024 | Jang | G06T 19/00 | |
| 2024/0404469 | A1 * | 12/2024 | Ko | G09G 3/3233 | |
| 2024/0420640 | A1 * | 12/2024 | Hwang | G09G 3/3258 | |
| 2025/0029556 | A1 * | 1/2025 | Cho | G09G 3/3225 | |
| 2025/0131882 | A1 * | 4/2025 | Kim | H10K 59/879 | |
| 2025/0140175 | A1 * | 5/2025 | Lee | G09G 3/32 | |
| 2025/0140176 | A1 * | 5/2025 | Lee | G09G 3/32 | |
| 2025/0140185 | A1 * | 5/2025 | Kim | G09G 3/3233 | |
| 2025/0140187 | A1 * | 5/2025 | Choi | G09G 3/3233 | |
| 2025/0140199 | A1 * | 5/2025 | Choi | G09G 3/3266 | |

* cited by examiner

LIGHT EMITTING DISPLAY PANEL AND LIGHT EMITTING DISPLAY APPARATUS USING THE SAME

CROSS-REFERENCE TO RELATED APPLICATIONS

This application claims priority to Korean Patent Application No. 10-2023-0144944 filed in the Republic of Korea, on Oct. 26, 2023, the entirety of which is hereby incorporated by reference into the present application as if fully set forth herein.

BACKGROUND

Field of the Invention

The present disclosure relates to a light emitting display panel and a light emitting display apparatus using the same.

Discussion of the Related Art

A plurality of light emitting display apparatuses for providing information or contents to a driver and a passenger can be mounted on a vehicle.

Among light emitting display apparatuses mounted on a vehicle, a light emitting display apparatus mounted on a dashboard is becoming increasingly larger.

However, because a viewing angle of a light emitting display apparatus mounted on a dashboard is fixed, drivers and passengers may feel uncomfortable watching videos in certain situations. For example, the light emitting display apparatus can be included in a vehicle and provide various information to a driver and a fellow passenger. However, the light emitting display apparatus in the vehicle may display content or cause bright lights inside the vehicle that distract the driver which can impair safety. Thus, there exists a need for a display device that is capable of selectively controlling the viewing angle and restricting displayed content in order to avoid interfering with the driver's concentration and improve safety, while also improving the convenience and experience of the passenger.

The above-described background is part of the present disclosure to devise the present disclosure or is technical information acquired by a process of devising the present disclosure, but may not be regarded as the known art disclosed to the general public before the present disclosure is disclosed.

SUMMARY OF THE DISCLOSURE

Accordingly, the present disclosure is directed to providing a light emitting display apparatus that substantially obviates one or more problems due to limitations and disadvantages of the related art.

An aspect of the present disclosure is directed to providing a light emitting display panel and a light emitting display apparatus using the same in which polarity types of a first viewing angle control transistor and a second viewing angle control transistor provided in a subpixel to control a viewing angle are different from each other.

Another aspect of the present disclosure is directed to providing a light emitting display panel and a light emitting display apparatus using the same in which only a first light emitting unit or only a second light emitting unit is driven in each of light emitting areas, and thus an image having a first viewing angle is output or an image having a second viewing angle is output.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description as well as the appended drawings.

To achieve these and other advantages and in accordance with the purpose of the disclosure, as embodied and broadly described herein, there is provided a light emitting display panel including a display area provided with subpixels and a non-display area provided outside the display area, in which each of the subpixels includes a first light emitting unit driven by a first viewing angle control transistor and a second light emitting unit driven by a second viewing angle control transistor, a first lens provided in the first light emitting unit and a second lens provided in the second light emitting unit have different shapes, and a polarity type of the first viewing angle control transistor is different from a polarity type of the second viewing angle control transistor.

To achieve these and other advantages and in accordance with the purpose of the disclosure, as embodied and broadly described herein, there is provided a light emitting display apparatus including a display area provided with subpixels and a non-display area provided outside the display area, in which each of the subpixels includes a first light emitting unit driven by a first viewing angle control transistor and a second light emitting unit driven by a second viewing angle control transistor, a first viewing angle of a light output from the first light emitting unit is different from a second viewing angle of a light output from the second light emitting unit, the display area is divided into at least two light emitting areas along a first direction, the display area is divided into at least two light emitting areas along a second direction different from the first direction, and only first light emitting units or only second light emitting units are driven in each of the light emitting areas.

It is to be understood that both the foregoing general description and the following detailed description of the present disclosure are examples and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
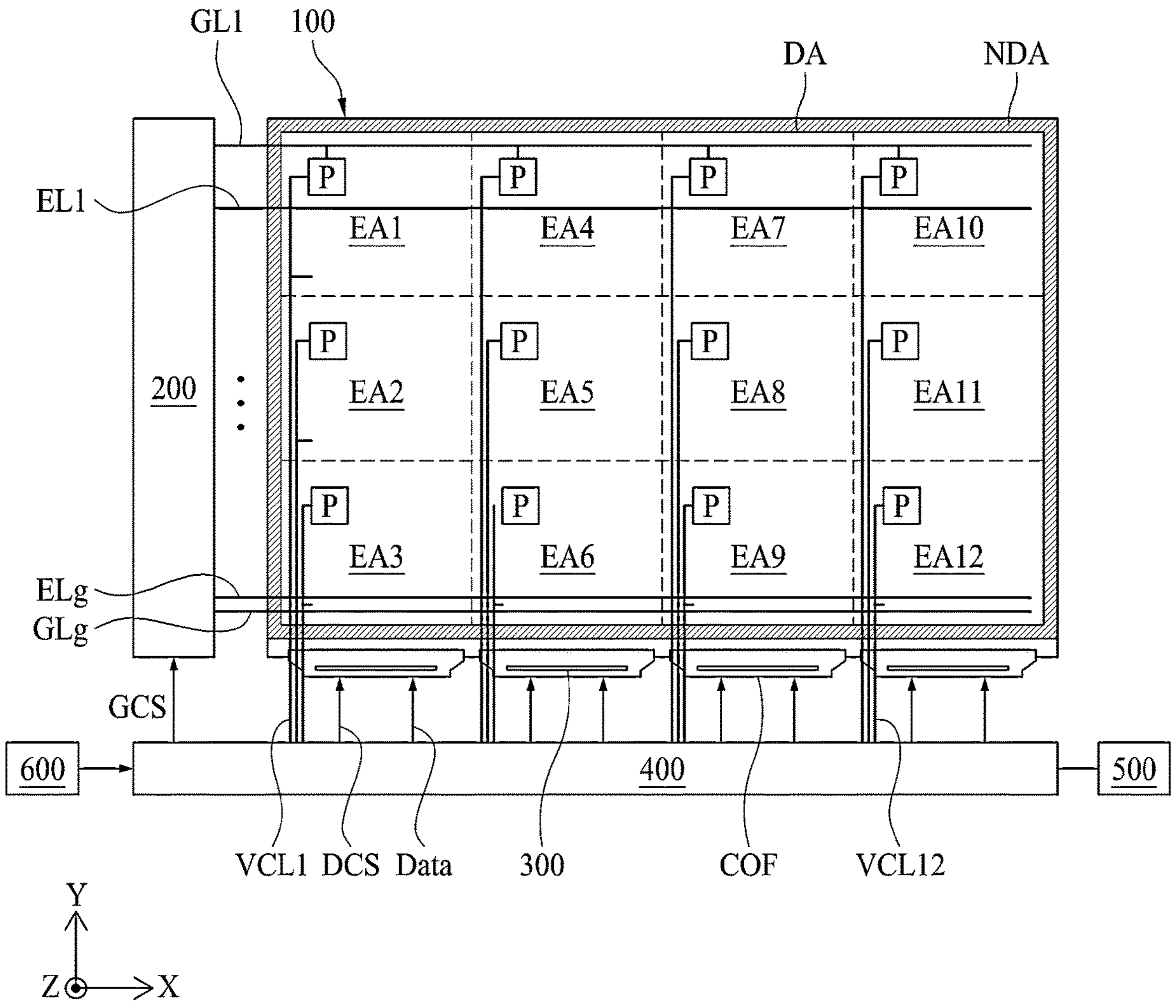
FIG. 1 is an example diagram illustrating a configuration of a light emitting display apparatus according to an embodiment of the present disclosure.

Reference will now be made in detail to the example embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When “comprise,” “have,” and “include” described in the present disclosure are used, another part can be added unless “only” is used. The terms of a singular form can include plural forms unless referred to the contrary.

In construing an element, the element is construed as including an error or tolerance range although there is no explicit description of such an error or tolerance range.

In describing a position relationship, for example, when a position relation between two parts is described as, for example, “on,” “over,” “under,” and “next,” one or more other parts can be disposed between the two parts unless a more limiting term, such as “just” or “direct(ly)” is used.

In describing a time relationship, for example, when the temporal order is described as, for example, “after,” “subsequent,” “next,” and “before,” a situation that is not continuous can be included unless a more limiting term, such as “just,” “immediate(ly),” or “direct(ly)” is used.

It will be understood that, although the terms “first,” “second,” etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms “first,” “second,” “A,” “B,” “(a),” “(b),” etc. can be used. These terms are intended to identify the corresponding elements from the other elements, and basis, order, or number of the corresponding elements should not be limited by these terms. The expression that an element is “connected,” “coupled,” or “adhered” to another element or layer the element or layer can not only be directly connected or adhered to another element or layer, but also be indirectly connected or adhered to another element or layer with one or more intervening elements or layers “disposed,” or “interposed” between the elements or layers, unless otherwise specified.

The term “at least one” should be understood as including any and all combinations of one or more of the associated listed items. For example, the meaning of “at least one of a first item, a second item, and a third item” denotes the combination of all items proposed from two or more of the first item, the second item, and the third item as well as the first item, the second item, or the third item. Also, the term “can” used herein includes all meanings and definitions of the word “may.”

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, embodiments of the present disclosure will be described in detail with reference to the accompanying drawings.

Figure 2:
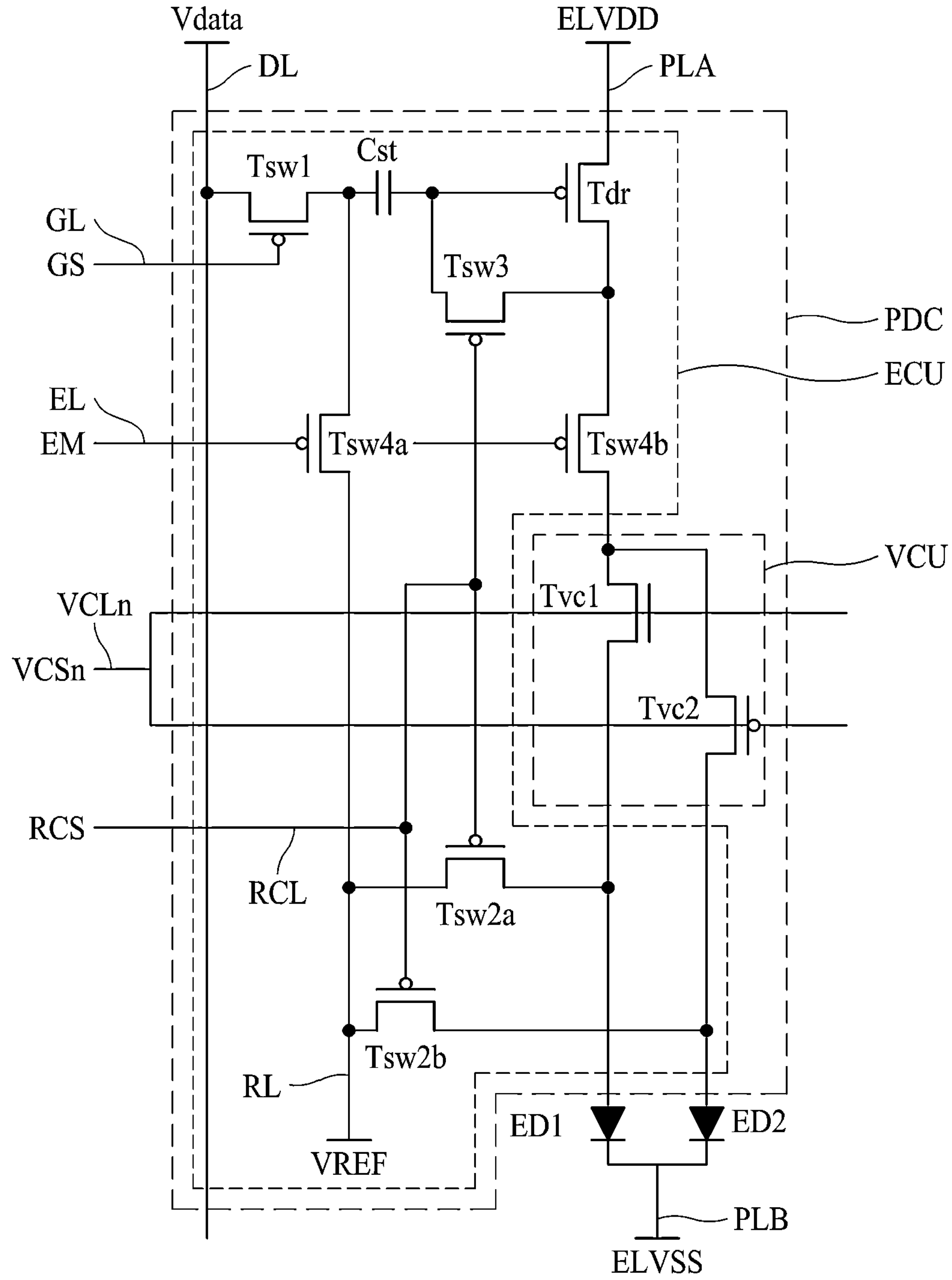
FIG. 2 is an example diagram illustrating a structure of a subpixel applied to a light emitting display apparatus according to an embodiment of the present disclosure.
Figure 3:
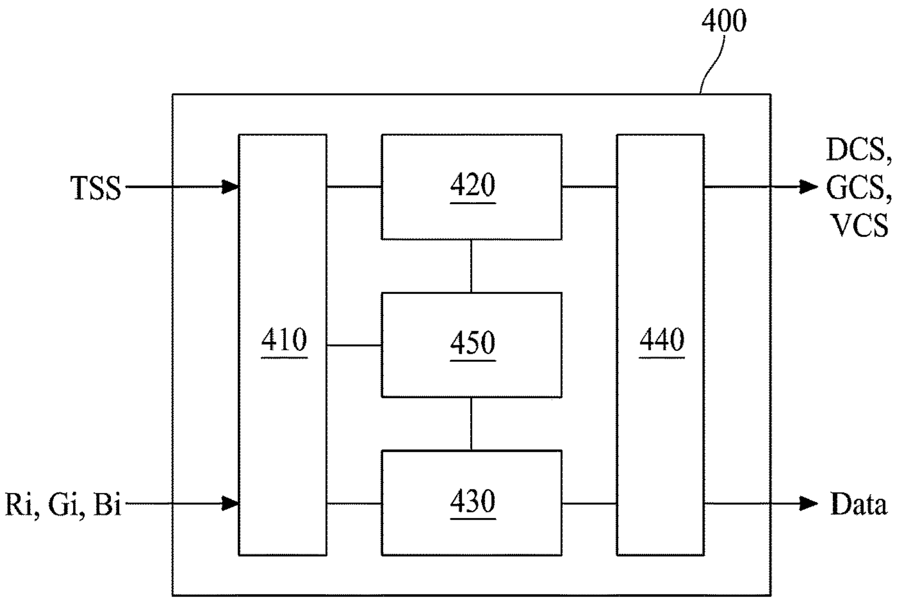
FIG. 3 is an example diagram illustrating a structure of a control driver applied to a light emitting display apparatus according to an embodiment of the present disclosure.
Figure 4:
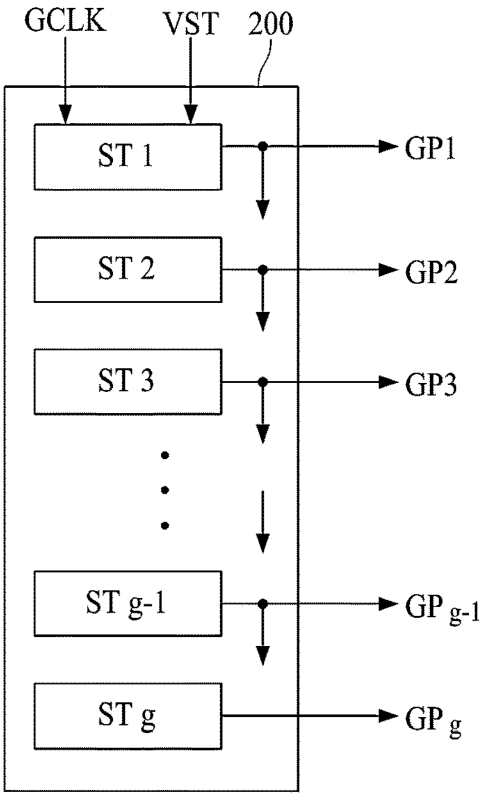
FIG. 4 is an example diagram illustrating a structure of a gate driver applied to a light emitting display apparatus according to an embodiment of the present disclosure.
Figure 5:
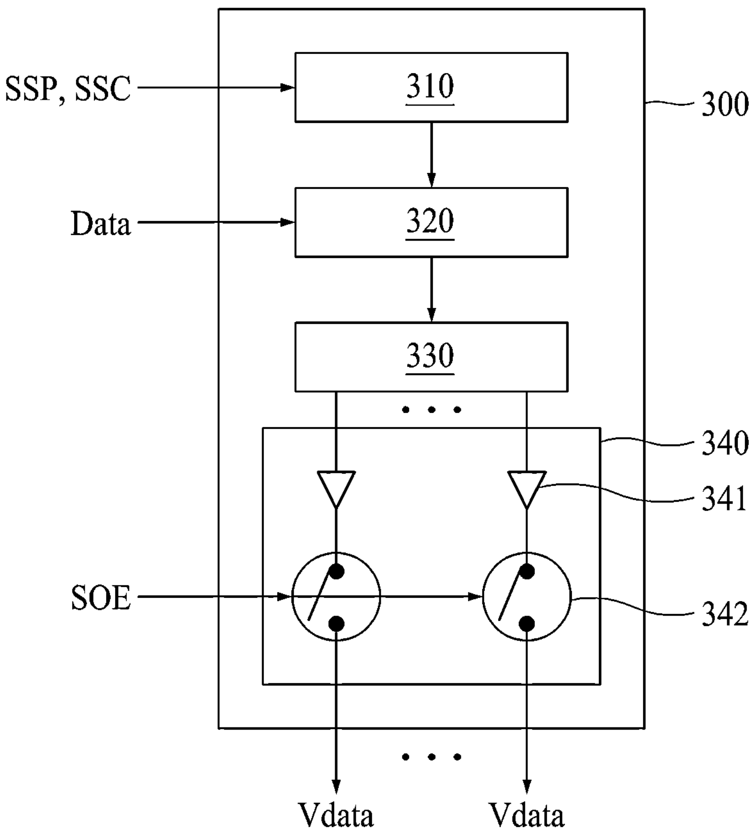
FIG. 5 is an example diagram illustrating a structure of a data driver applied to a light emitting display apparatus according to an embodiment of the present disclosure.

FIG. 1 is an example diagram illustrating a configuration of a light emitting display apparatus according to an embodiment of the present disclosure, FIG. 2 is an example diagram illustrating a structure of a subpixel applied to a light emitting display apparatus according to an embodiment of the present disclosure, FIG. 3 is an example diagram illustrating a structure of a control driver applied to a light emitting display apparatus according to an embodiment of the present disclosure, FIG. 4 is an example diagram illustrating a structure of a gate driver applied to a light emitting display apparatus according to an embodiment of the present disclosure, and FIG. 5 is an example diagram illustrating a structure of a data driver applied to a light emitting display apparatus according to an embodiment of the present disclosure.

A light emitting display apparatus according to an embodiment of the present disclosure can be any one of an organic light emitting diode display apparatus, a quantum dot light emitting diode display apparatus, and an inorganic light emitting diode display apparatus. That is, a light emitting display apparatus according to an embodiment of the present disclosure can be an electroluminescent display apparatus. Moreover, a light emitting display apparatus according to an embodiment of the present disclosure can be a micro light emitting diode display apparatus.

A light emitting display apparatus according to an embodiment of the present disclosure can be used as various kinds of electronic devices. Electronic devices can be, for example, televisions, monitors, etc., and can be automotive electronic devices mounted and used in vehicle. Particularly, a light emitting display apparatus according to an embodiment of the present disclosure can be mounted on a dashboard of a vehicle to provide information and various images related to an operation of the vehicle to a driver and a passenger. Hereinafter, for convenience of description, a light emitting display apparatus mounted on a dashboard of a vehicle to be used will be described as an example of a light emitting display apparatus according to an embodiment of the present disclosure. However, according to embodiments, the light emitting display apparatus can also be a standalone device (e.g., a portable device, smart phone, etc.).

The light emitting display apparatus according to an embodiment of the present disclosure, as illustrated in FIG. 1, can include a light emitting display panel 100 which includes a display area DA displaying an image and a non-display area NDA provided outside the display area DA, a gate driver 200 which supplies gate signals GS to a plurality of gate lines GL1 to GLg provided in the display area DA of the light emitting display panel 100, a data driver 300 which supplies data voltages Vdata to a plurality of data lines DLI to DLd provided in the display area DA of the light emitting display panel 100, a control driver 400 (e.g., controller or timing controller) which controls driving of the gate driver 200 and the data driver 300, and a power supply unit 500 which supplies power to the control driver 400, the gate driver 200, the data driver 300, and the light emitting display panel 100.

First, the light emitting display panel 100 can include a display area DA and a non-display area NDA. Gate lines GL1 to GLg, data lines DLI to DLd, and subpixels P can be provided in the display area DA. Accordingly, an image can be displayed in the display area DA. Here, g and d are natural numbers. The non-display area NDA can surround the outer periphery of the display area DA.

The subpixel P included in the light emitting display panel 100, as illustrated in FIG. 2, can include a pixel driving circuit PDC which includes a switching transistor Tsw1, a storage capacitor Cst, a driving transistor Tdr, a first reference transistor Tsw2*a*, a second reference transistor Tsw2*b*, a first viewing angle control transistor Tvc1, and a second viewing angle control transistor Tvc2, and a first light emitting device ED1 and a second light emitting device ED2 which are connected to the pixel driving circuit PDC.

A first terminal of the driving transistor Tdr can be connected to a first voltage supply line through which a first voltage EVDD is supplied, and a second terminal of the driving transistor Tdr can be connected to the light emitting device ED.

A first terminal of the switching transistor Tsw1 can be connected to a data line DL, a second terminal of the switching transistor Tsw1 can be connected to a first terminal of the storage capacitor Cst, and a gate of the switching transistor Tsw1 can be connected to a gate line GL.

A data voltage Vdata can be supplied through the data line DL from the data driver 300. A gate signal GS can be supplied through the gate line GL from the gate driver 200. The gate signal GS can include a gate pulse GP for turning on the switching transistor Tsw1 and a gate-off signal for turning off the switching transistor Tsw1.

The first reference transistor Tsw2*a* and the second reference transistor Tsw2*b* can be provided for measuring a threshold voltage of the driving transistor Tdr or mobility, or supplying a reference voltage VREF to the pixel driving circuit PDC.

A first terminal of the first reference transistor Tsw2*a* can be connected to a reference line RL through which a reference voltage VREF is supplied, a second terminal of the first reference transistor Tsw2*a* can be connected to a second terminal of the first viewing angle control transistor Tvc1 and the first light emitting device ED1, and a gate of the first reference transistor Tsw2*a* can be connected to a reference control line RCL through which a reference control signal RCS is supplied.

A first terminal of the second reference transistor Tsw2*b* can be connected to a reference line RL through which the reference voltage VREF is supplied, a second terminal of the second reference transistor Tsw2*b* can be connected to a second terminal of the second viewing angle control transistor Tvc2 and the second light emitting device ED2, and a gate of the second reference transistor Tsw2*b* can be connected to the reference control line RCL through which the reference control signal RCS is supplied.

The reference line RL can be connected to the data driver 300 and can be connected to the power supply unit 500 through the data driver 300. For example, the reference voltage VREF supplied from the power supply unit 500 can be supplied to the subpixels through the reference line RL, sensing signals transmitted from the subpixels P can be converted into digital sensing signals in the data driver 300, and the digital sensing signals can be transmitted to the control driver 400.

A first terminal of the storage capacitor Cst can be connected to a second terminal of the switching transistor Tsw1, and a second terminal of the storage capacitor Cst can be connected to a gate of the driving transistor Tdr.

A first terminal of the first viewing angle control transistor Tvc1 can be connected to the second terminal of the driving transistor Tdr, a second terminal of the first viewing angle control transistor Tvc1 can be connected to the first light emitting device ED1, and a gate of the first viewing angle control transistor Tvc1 can be connected to an nth viewing angle control line VCLn.

A first terminal of the second viewing angle control transistor Tvc2 can be connected to the second terminal of the driving transistor Tdr, a second terminal of the second viewing angle control transistor Tvc2 can be connected to the second light emitting device ED2, and a gate of the second viewing angle control transistor Tve2 can be connected to the nth viewing angle control line VCLn.

That is, the gate of the first viewing angle control transistor Tvc1 and the gate of the second viewing angle control transistor Tvc2 can be connected to the nth viewing angle control line VCLn. Here, n is a natural number smaller than or equal to m, which is the number of light emitting areas provided in the display area DA. That is, the nth viewing angle control line VCLn can mean a viewing angle control line connected to an nth light emitting area among m light emitting areas. Here, m is a natural number greater than 1.

For example, when the display area DA is divided into 12 light emitting areas EA1 to EA12 as illustrated in FIG. 1, m is 12. In this situation, gates of first viewing angle control transistors Tvc1 provided in a first light emitting area EA1 and gates of second viewing angle control transistors Tvc2 provided in the first light emitting area EA1 can be connected to a first viewing angle control line VCL1. Also, gates of first viewing angle control transistors Tvc1 provided in a 12th light emitting area EA12 and gates of second viewing angle control transistors Tvc2 provided in the 12th light emitting area EA12 can be connected to a 12th viewing angle control line VCL12. For example, the light emitting display panel 100 can selectively operate in either a first mode (e.g., wide viewing angle mode or sharing view mode) or a second mode (e.g., a narrow viewing angle mode or a privacy view mode) on a pixel block-by-pixel block basis.

In this situation, a polarity type of the first viewing angle control transistor Tvc1 and a polarity type of the second viewing angle control transistor Tvc2 are different from each other.

For example, when the first viewing angle control transistor Tvc1 is an N-type transistor, the second viewing angle control transistor Tvc2 is a P-type transistor, and when the first viewing angle control transistor Tvc1 is a P-type transistor, the second viewing angle control transistor Tvc2 is an N-type transistor.

Accordingly, when the first viewing angle control transistor Tvc1 is turned on, the second viewing angle control transistor Tvc2 can be turned off, and when the first viewing angle control transistor Tvc1 is turned off, the second viewing angle control transistor Tvc2 can be turned on.

For example, as illustrated in FIG. 2, the gate of the first viewing angle control transistor Tvc1 and the gate of the second viewing angle control transistor Tvc2 are connected to an nth viewing angle control line VCLn. Therefore, when an nth viewing angle control signal VCSn having a high level or low level is input through the nth viewing angle control line VCLn, any one of the first viewing angle control transistor Tvc1 and the second viewing angle control transistor Tvc2 can be turned on and the other can be turned off.

As illustrated in FIG. 2, the pixel driving circuit PDC can further include a connection transistor Tsw3 and emission transistors Tsw4*a* and Tsw4*b*.

A first terminal of the connection transistor Tsw3 can be connected to the gate of the driving transistor Tdr, a second terminal of the connection transistor Tsw3 can be connected to the second terminal of the driving transistor Tdr, and a gate of the connection transistor Tsw3 can be connected to the reference control line RCL.

A first terminal of a first emission transistor Tsw4*a* can be connected to the second terminal of the switching transistor Tsw1, a second terminal of the first emission transistor Tsw4*a* can be connected to the reference line RL, and a gate of the first emission transistor Tsw4*a* can be connected to an emission line EL.

A first terminal of the second emission transistor Tsw4*b* can be connected to the second terminal of the driving transistor Tdr, a second terminal of the second emission transistor Tsw4*b* can be connected to the first viewing angle control transistor Tvc1 and the second viewing angle control transistor Tvc2, and a gate of the second emission transistor Tsw4*b* can be connected to the emission line EL. An emission signal EM can be supplied to the emission line EL.

The first light emitting device ED1 connected to the pixel driving circuit PDC can include a first electrode which receives the first voltage EVDD through the driving transistor Tdr and the first viewing angle control transistor Tve1, a second electrode connected to a second voltage supply line PLB supplied with a second voltage EVSS, and a light emitting layer provided between the first electrode and the second electrode.

The second light emitting device ED2 connected to the pixel driving circuit PDC can include a first electrode which receives the first voltage EVDD through the driving transistor Tdr and the second viewing angle control transistor Tvc2, a second electrode connected to the second voltage supply line PLB supplied with the second voltage EVSS, and a light emitting layer provided between the first electrode and the second electrode.

The structure of the subpixel P applied to a light emitting display apparatus according to an embodiment of the present disclosure is not limited to the structure illustrated in FIG. 2. Accordingly, the structure of the subpixel P can be changed to various shapes and configurations based on design considerations.

Particularly, the pixel driving circuit PDC applied to a light emitting display apparatus according to an embodiment of the present disclosure, as illustrated in FIG. 2, can include a light emitting control unit ECU (e.g., light emitting control circuit or light emitting control part) and a viewing angle control unit VCU (e.g., viewing angle control circuit or viewing angle control part). The light emitting control unit ECU can control a level of current supplied to the light emitting device ED1 or ED2 and a timing at which the current is supplied to the light emitting device ED1 or ED2. The viewing angle control unit VCU can control a viewing angle of light to be output from the light emitting device ED1 or ED2. In this situation, the structure and function of the light emitting control unit ECU can be changed in various shapes and configurations.

The control driver 400 (e.g., controller or timing controller) can realign input image data Ri, Gi, and Bi transmitted from an external system 600 by using a timing synchronization signal TSS transmitted from the external system and can generate a data control signal DCS which is to be supplied to the data driver 300 and a gate control signal GCS which is to be supplied to the gate driver 200.

To this end, as illustrated in FIG. 3, the control driver 400 can include a data aligner 430 which realigns input image data Ri, Gi, and Bi to generate image data Data and transmits the image data Data to the data driver 300, a control signal generator 420 which generates the gate control signal GCS and the data control signal DCS by using the timing synchronization signal TSS, an input unit 410 which transmits the timing synchronization signal TSS transmitted from the external system 600 to the control signal generator 420 and transmits the input image data Ri, Gi, and Bi transmitted from the external system 600 to the data aligner 430, and an output unit 440 which supplies the data driver 300 with the image data Data generated by the data aligner 430 and the data control signal DCS generated by the control signal generator 420 and supplies the gate driver 200 with the gate control signal GCS generated by the control signal generator 420.

The control signal generator 420 can generate a power control signal supplied to the power supply unit 500.

The control driver 400 can further include a storage unit for storing various information. The storage unit 450 can be included in the control driver 400 as illustrated in FIG. 3, but can be separated from the control driver 400 and provided independently.

The control signal generator 420 can generate viewing angle control signals VCS and supply them to a first viewing angle control line VCL1 to an mth viewing angle control line VCLm.

For example, when the display area DA is divided into 12 light emitting areas EA1 to EA12 as illustrated in FIG. 1, m is 12. In this situation, the control signal generator 420 can generate a first to 12th viewing angle control signals and supply them to the first to 12th viewing angle control lines VCL1 to VCL12. In this way, the light emitting display panel 100 can selectively operate in either a first mode (e.g., wide viewing angle mode or sharing view mode) or a second mode (e.g., a narrow viewing angle mode or a privacy view mode) on a pixel block-by-pixel block basis. For example, one or more pixel blocks can operate in a privacy view mode having a narrow viewing angle, while the remaining pixel blocks can operation in a sharing view mode having a wide viewing angle.

The external system 600 can perform a function of driving the control driver 400 and an electronic device.

For example, when the electronic device is mounted on a vehicle, the external system 600 can receive various kinds of sound information, image information, notification information and letter information over a communication network and can receive various image information related to an operation of the vehicle over other electronic devices mounted on the vehicle. The external system 600 can transmit the received image information to the control driver 400. The external system 600 can convert the image information into input image data Ri, Gi, and Bi and transmit the input image data Ri, Gi, and Bi to the control driver 400.

The power supply unit 500 can generate various powers and supply the generated powers to the control driver 400, the gate driver 200, the data driver 300, and the light emitting display panel 100.

The gate driver 200 can be directly embedded into the non-display area NDA by using a gate-in panel (GIP) type, or the gate driver 200 can be provided in the display area DA in which light emitting devices ED are provided, or the gate driver 200 can be provided on a chip on film mounted in the non-display area NDA.

The gate driver 200 can supply gate pulses GP1 to GPg to the gate lines GL1 to GLg.

When a gate pulse GP generated by the gate driver 200 is supplied to a gate of the switching transistor Tsw1 included in the subpixel P, the switching transistor Tsw1 can be turned on. When the switching transistor Tsw1 is turned on, data voltage Vdata supplied through a data line DL can be supplied to the subpixel P.

When a gate-off signal generated by the gate driver 200 is supplied to the switching transistor Tsw1, the switching transistor Tsw1 can be turned off. When the switching transistor Tsw1 is turned off, a data voltage may not be supplied to the subpixel P any longer.

The gate signal GS supplied to the gate line GL can include the gate pulse GP and the gate-off signal.

To supply gate pulses GP1 to GPg to gate lines GL1 to GLg, the gate driver 200, as illustrated in FIG. 4, can include stages ST1 to STg connected to gate lines GL1 to GLg.

Each of the stages ST1 to STg can be connected to one gate line GL, but can be connected to at least two gate lines GL.

In order to generate gate pulses GP1 to GPg, a gate start signal VST and at least one gate clock GCLK which are generated by the control signal generator 420 can be transferred to the gate driver 200. For example, the gate start signal VST and the at least one gate clock GCLK can be included in the gate control signal GCS.

One of the stages ST1 to STg can be driven by a gate start signal VST to output a gate pulse GP to a gate line GL. The gate pulse GP can be generated by a gate clock GCLK.

At least one of signals output from a stage ST where a gate pulse is output can be supplied to another stage ST to drive another stage ST. Accordingly, a gate pulse can be output in another stage ST.

For example, the stages ST can be driven sequentially to sequentially supply the gate pulses GP to the gate lines GL.

As described above, each of the stages ST1 to STg can be connected to one gate line GL, but can also be connected to at least two gate lines GL.

Also, when the subpixel P has the structure illustrated in FIG. 2, each of the stages ST1 to STg can be connected to at least one gate line GL and at least one reference control line RCL. The reference control signals RCS output through the reference control lines RCL can be generated by the same or similar method to a method by which gate pulses are generated, and then can be sequentially output to the reference control lines RCL.

In this situation, a stage connected to the gate line GL illustrated in FIG. 2 and a stage connected to the reference control line RCL illustrated in FIG. 2 can be the same or different.

Moreover, stages for generating gate signals to be supplied to the gate lines GL and stages for generating reference control signals RCS to be supplied to the reference control lines RCL can be independently provided in the gate drivers 200.

That is, the number, type, and connection structure of lines connected to one stage can vary depending on a structure of the subpixels P and a driving method of the subpixels P.

Also, as illustrated in FIG. 2, when the emission line EL to which the emission signal EM is supplied is connected to the subpixel P, after the emission signals EM are generated in the gate driver 200 by the same method as the gate signals GS, the emission signals EM can be output to the emission lines EL.

For example, the gate driver 200 can generate gate signals GS and emission signals EM, and can also generate reference control signals RCS.

In this situation, gate signals GS, emission signals EM, and reference control signals RCS can be generated through stages St 1 to ST g as illustrated in FIG. 4. Alternatively, stages for generating gate signals GS, stages for generating emission signals EM, and stages for generating reference control signals RCS can be independently provided in the gate driver 200. Alternatively, stages for generating gate signals GS and reference control signals RCS and stages for generating emission signals EM can be independently provided in the gate driver 200.

Therefore, the specific structure of the gate driver 200 can be changed in various shapes and configurations depending on a structure of the subpixels P, a driving method of the subpixels P, and the number and type of lines connected between the subpixels P and the gate driver 200.

Finally, the data driver 300 can supply data voltages Vdata to the data lines DLI to DLd.

To this end, the data driver 300, as illustrated in FIG. 5, can include a shift register 310 which outputs a sampling signal, a latch 320 which latches image data Data received from the control driver 400, a digital-to-analog converter 330 which converts the image data Data, transmitted from the latch 320, into a data voltage Vdata and outputs the data voltage Vdata, and an output buffer 340 which outputs the data voltage, transmitted from the digital-to-analog converter 330, to the data line DL based on a source output enable signal SOE.

The shift register 310 can output the sampling signal by using the data control signal DCS received from the control signal generator 420. For example, the data control signals DCS transmitted to the shift register 310 can include a source start pulse SSP and a source shift clock signal SSC.

The latch 320 can latch image data Data sequentially received from the control driver 400, and then output the image data Data to the digital-to-analog converter 330 at the same time based on the sampling signal.

The digital-to-analog converter 330 can convert the image data Data transmitted from the latch 320 into data voltages Vdata and output the data voltages Vdata.

The output buffer 340 can simultaneously output the data voltages Vdata transmitted from the digital-to-analog converter 330 to data lines DLI to DLd of the light emitting display panel 100 based on the source output enable signal SOE transmitted from the control signal generator 420.

To this end, the output buffer 340 can include a buffer 341 which stores the data voltage Vdata transmitted from the digital-to-analog converter 330 and a switch 342 which outputs the data voltage Vdata stored in the buffer 341 to the data line DL based on the source output enable signal SOE.

For example, when the switches 342 are turned on based on the source output enable signal SOE simultaneously supplied to the switches 342, the data voltages Vdata stored in the buffers 341 can be supplied to the data lines DLI to DLd through the switches 342.

The data voltages Vdata supplied to the data lines DLI to DLd can be supplied to subpixels P connected to a gate line GL supplied with a gate pulse GP.

Hereinafter, additional features for the configurations described above will be described.

The display area DA can include pixel row lines and pixel column lines provided with subpixels P. For example, the pixel row lines can mean subpixels P provided along a first direction (X-axis direction) illustrated in FIG. 1, and the pixel column lines can mean subpixels P provided along a second direction (Y-axis direction) illustrated in FIG. 1.

A subpixel P can be any one of a red subpixel emitting red light, a green subpixel emitting green light, a blue subpixel emitting blue light, and a white subpixel emitting white light. A unit pixel can include at least two subpixels. For example, white light can be output by a unit pixel.

The subpixel P can include the first and second light emitting devices ED1 and ED2 (e.g., first and second light emitting elements), the pixel driving circuit PDC including transistors which drive the first and second light emitting devices ED1 and ED2, the first lens disposed on the first light emitting device ED1, and the second lens disposed on the second light emitting device ED2. For example, the first lens can have a semi-cylindrical shape or a rounded rectangle shape in a plan view for providing a wide viewing angle, and the second lens can have a hemispherical shape or a dome shape for providing a narrow viewing angle, described in more detail below with regards to FIG. 9A and FIG. 9B.

A first light emitting unit can include the first light emitting device ED1 driven by the first viewing angle control transistor Tvc1 and the first lens disposed on the first light emitting device ED1. Also, a second light emitting unit can include the second light emitting device ED2 driven by the second viewing angle control transistor Tvc2 and the second lens disposed on the second light emitting device ED2.

The first light emitting unit can be driven by the first viewing angle control transistor Tvc1, and the second light emitting unit can be driven by the second viewing angle control transistor Tvc2.

The first viewing angle control transistor Tve1 can be connected between the first light emitting unit and the driving transistor Tdr which controls a level of current supplied to the first or second light emitting unit. The second viewing angle control transistor Tvc2 can be connected between the driving transistor Tdr and the second light emitting unit. The second emission transistor Tsw4*b* can be connected between the first viewing angle control transistor Tvc1 and the driving transistor Tdr and between the second viewing angle control transistor Tvc2 and the driving transistor Tdr.

The first lens provided in the first light emitting unit and the second lens provided in the second light emitting unit can have different shapes.

Particularly, an exit angle, that is, a viewing angle, of a light output through the first lens can be different from a viewing angle of a light output through the second lens.

For example, the subpixel P can operate in a wide viewing angle mode or a share mode (hereinafter, simply referred to as a share mode (SM)) by driving the first light emitting device ED1 to output a light through the first lens. Moreover, the subpixel P can operate in a narrow viewing angle mode or privacy mode (hereinafter, simply referred to as a privacy mode (PM)) which limits a viewing angle by driving the second light emitting device ED2 to output a light through the second lens.

The narrow viewing angle mode can denote a mode having a narrower viewing angle (hereinafter, simply referred to as a narrow viewing angle or a second viewing angle) than a viewing angle (hereinafter, simply referred to as a wide viewing angle or a first viewing angle) in the wide viewing angle mode.

That is, the light emitting display apparatus according to an embodiment of the present disclosure can selectively drive the first light emitting device ED1 and the second light emitting device ED2 of the subpixel P, thereby controlling a viewing angle of the subpixel P. A detailed description thereof will be provided later.

The display area DA can be divided into at least two light emitting areas along the first direction, and the display area DA can be divided into at least two light emitting areas along the second direction different from the first direction. For example, as illustrated in FIG. 1, the display area DA can be divided into four light emitting areas along the first direction X and can be divided into three light emitting areas along the second direction Y. That is, FIG. 1 shows a light emitting display panel including a display area DA divided into 12 light emitting areas EA1 to EA12. Also, each of the 12 light emitting areas EA1 to EA12 can be individually controlled to operate in the share mode with the wide viewing angle or the privacy mode with the narrow viewing angle.

For example, when the first light emitting devices ED1 are driven in subpixels P of a first light emitting area EA1 illustrated in FIG. 1 and a light is output through the first lenses, the first light emitting area EA1 can operate in the wide viewing angle mode (e.g., share mode), and when the second light emitting device ED2 are driven in the subpixels P of the first light emitting area EA1 and a light is output through the second lenses, the first light emitting area EA1 can operate in the narrow viewing angle mode (e.g., privacy mode).

In this situation, when the first light emitting device ED1 are driven in subpixels P of the second light emitting area EA2 and a light is output through the first lenses, the second light emitting area EA2 can operate in the wide viewing angle mode (e.g., share mode), and when the second light emitting device ED2 are driven in the subpixels P of the second light emitting area EA2 and a light is output through the second lenses, the second light emitting area EA2 can operate in the narrow viewing angle mode (e.g., privacy mode).

Each of a third to 12th light emitting areas EA3 to EA12 can also operate in the wide viewing angle mode or the narrow viewing angle mode.

For example, all of the first to 12th light emitting areas EA1 to EA12 can operate in the wide viewing angle mode or can operate in the narrow viewing angle mode. Alternatively, some of the first to 12th light emitting areas EA1 to EA12 can operate in the wide viewing angle mode, and others can operate in the narrow viewing angle mode.

Accordingly, positions of light emitting areas operating in the wide viewing angle mode and positions of light emitting areas operating in the narrow viewing angle mode can be variously changed and dynamically adjusted (e.g., the different areas can be set based on a user input or based on a default setting, etc.). In particular, the positions of the light emitting areas operating in the wide viewing angle mode and the positions of the light emitting areas operating in the narrow viewing angle mode can be variously changed along the first direction X and can be variously changed along the second direction Y.

The light emitting display apparatus according to an embodiment of the present disclosure can further include a touch screen disposed in the display area DA to sense the user's touch.

The touch screen can be bonded to the light emitting display panel 100 or can be embedded into the light emitting display panel 100.

For example, the light emitting display panel 100 can include a pixel driving circuit layer including transistors disposed on a substrate, a light emitting device layer including light emitting devices disposed on the pixel driving circuit layer, an encapsulation layer disposed to encapsulate the light emitting device layer, a touch sensor array including touch electrodes disposed on the encapsulation layer, and a lens array disposed on the touch sensor array. In this situation, the light emitting display panel 100 can further include an optical film, an optical clear adhesive (OCA), a cover substrate, and a protection film which are sequentially disposed on the lens array. The light emitting display panel 100 can further include a color filter array including a color filter and a black matrix disposed between the touch sensor array and the lens array.

As described above, the gate driver 200 can generate gate signals GS and emission signals EM, and can also generate reference control signals RCS. In the following description, the gate signals GS, emission signals EM, and reference control signals RCS are referred to as scan signals.

That is, the gate driver 200 can supply at least one scan signal to each of the pixel row lines by using the gate control signal GCS supplied from the control driver 400. For example, a subpixel P to which three scan signals GS, EM, and RCS are supplied is illustrated in FIG. 2.

The transistors provided in the subpixels P and the transistors included in the gate driver 200 provided in the display area DA or the non-display area NDA can be formed by using at least one of an LTPS transistor using a low temperature poly silicon (LTPS) and an oxide transistor using a metal-oxide semiconductor. Particularly, in order to reduce power consumption, the LTPS transistor and the oxide transistor can coexist in the light emitting display panel 100.

The data driver 300 can be a data drive IC (Integrated Circuit) as illustrated in FIG. 1, and at least one data driver IC can be mounted on the light emitting display panel 100. FIG. 1 shows a light emitting display panel 100 on which four data drivers 300 including four data driver ICs are mounted.

Each of the data driver ICs can be individually mounted on each circuit film. The circuit film on which the data drive IC is mounted can be bonded to the non-display area NDA in which a pad area of the light emitting display panel 100 is disposed through an anisotropic conductive film (ACF). The circuit film can be a chip on film (COF). Moreover, in addition to the COF, FPC (Flexible Printed Circuit) or FFC (Flexible Flat Cable) can be used as the circuit film.

The control driver 400 can control the gate driver 200 and the data driver 300 by using timing synchronization signals TSS supplied from the external system 600 and timing setting information stored therein.

To this end, the control driver 400 can generate gate control signal GCS which controls a driving timing of the gate driver 200 and supply them to the gate driver 200, and generate data control signal DCS which controls a driving timing of the data driver 300 and supply them to the data driver 300.

Moreover, the control driver 400 can perform various image processing which include image quality correction, deterioration correction, and luminance correction for the reduction of power consumption, for received input image data Ri, Gi, and Bi, and then can supply the image-processed data Data to the data driver 300.

Figure 6:
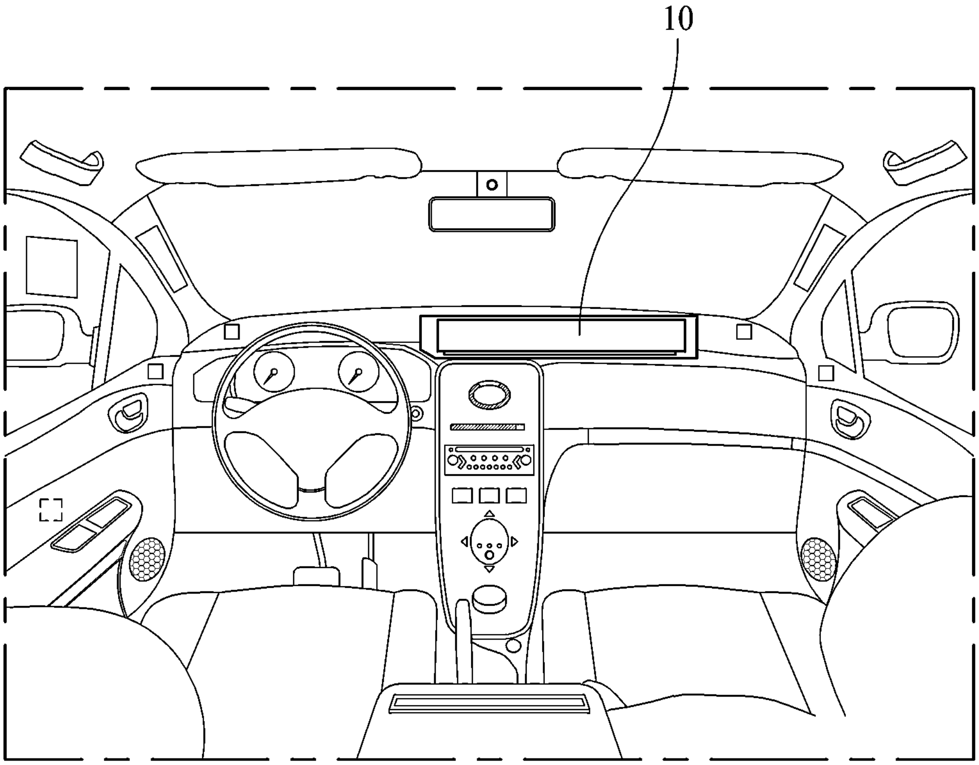
FIG. 6 is an example diagram illustrating an internal structure of a vehicle to which a light emitting display apparatus according to an embodiment of the present disclosure is applied.

FIG. 6 is an example diagram illustrating an internal structure of a vehicle to which a light emitting display apparatus according to an embodiment of the present disclosure is applied, and FIGS. 7A to 7F are example diagrams illustrating how viewing angles of light emitting areas change in a light emitting display panel according to an embodiment of the present disclosure. Particularly, a light emitting display panel 100 divided into 12 light emitting areas EA1 to EA12 is illustrated in FIGS. 7A to 7F. Accordingly, hereinafter, a light emitting display apparatus according to an embodiment of the present disclosure will be described with reference to FIGS. 1 to 7F.

For example, as illustrated in FIG. 6, a light emitting display apparatus 10 according to an embodiment of the present disclosure can be placed in a center of a vehicle dashboard to display images to both a driver and a passenger in a passenger seat, but embodiments are not limited thereto. For example, the light emitting display panel 100 of the light emitting display apparatus 10 can include first to 12th light emitting areas EA1 to 12, and viewing angles of the first light emitting area EA1 to the 12th light emitting areas EA12 can be independently varied.

Here, the viewing angles mean the wide viewing angle and the narrow viewing angle. The wide viewing angle means a wider viewing angle than the narrow viewing angle. In the following description, a light emitting area where an image with the wide viewing angle is output is referred to as a wide viewing angle mode area or a share mode area, and a light emitting area where an image with the narrow viewing angle is output is referred to as a narrow viewing angle mode area or a privacy mode area. For example, the wide viewing angle can be viewed by both the driver and the passenger, while the narrow viewing angle can be viewed by only one of the driver and the passenger, but embodiments are not limited thereto.

Figure 7A:
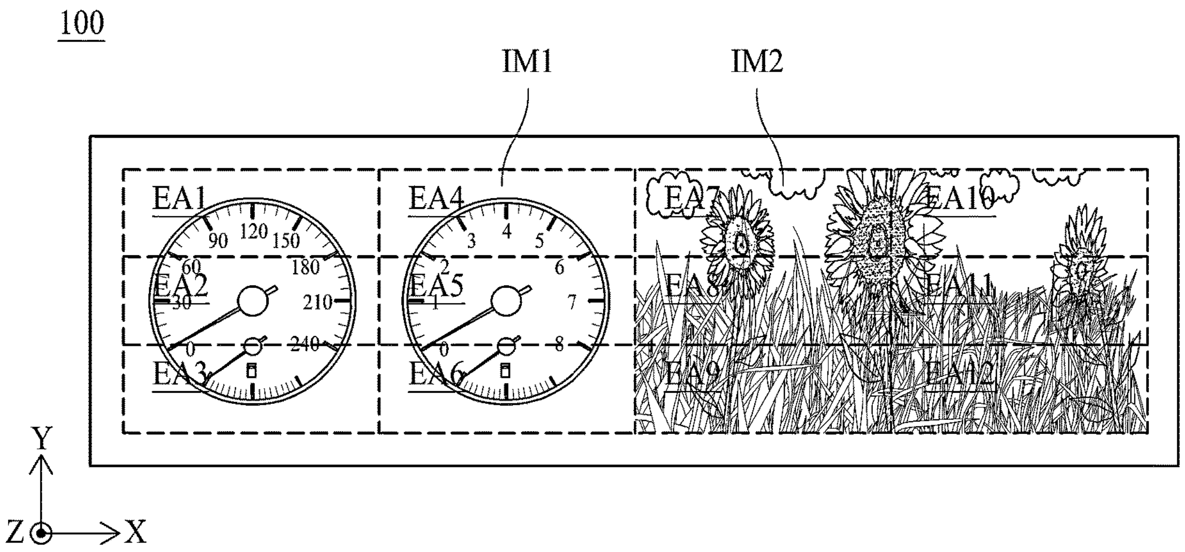
FIGS. 7A to 7F are example diagrams illustrating how viewing angles of light emitting areas can selectively change in a light emitting display panel according to an embodiment of the present disclosure.

First, referring to FIG. 7A, the first to 6th light emitting areas EA1 to EA6 of the light emitting display panel 100 can provide a first image having the wide viewing angle in the left and right directions to a driver and a passenger of a passenger seat. For example, in this way, the speedometer, the tachometer and fuel gauge can be viewable by both the driver and the passenger, while the passenger can view content that is not visible to the driver (e.g., a movie or video about sunflowers). In this way, a passenger seated next to the driver can comfortably watch or view content while in the second mode (e.g., privacy mode) without disturbing the driver, since it can display content with a narrow viewing angle.

The first image IM1 can denote an image which provides information related to an operation of a vehicle (hereinafter simply referred to as a vehicle operation information image, and the vehicle operation information image can also be indicated by the reference numeral IM1). For example, as illustrated in FIG. 7A, the first image IM1 can provide a speed of a vehicle, a mileage of a vehicle, and an amount of fuel of a vehicle.

The vehicle operation information image should be viewable not only to a driver but also to a passenger. Because the first image IM1 has a wide viewing angle, both a driver and a passenger can see the first image IM1. Accordingly, the first to 6th light emitting areas EA1 to EA6 can be the share mode areas.

Particularly, the vehicle operation information image should be displayed while the vehicle is operated, be displayed in a size which meets established standards, and be displayed in an area most visible to a driver. Therefore, while a vehicle is operated, the vehicle operation information image should be displayed unconditionally, regardless of a driver's choice, and the light emitting areas where the vehicle operation information image is output should also be fixed. For example, when the first image IM1 is the vehicle operation information image, the first image IM1 can be fixedly displayed in the first to 6th light emitting areas EA1 to EA6, as illustrated in FIG. 7A.

In this situation, the 7th to 12th light emitting areas EA7 to EA12 of the light emitting display panel 100 can display a second image IM2 having the narrow viewing angle in the left and right directions so that it is viewable only by a passenger of a passenger seat so as not to interfere with a driver's driving, which can improve safety and convenience.

The second image IM2 can denote, for example, an image received through various communication networks (hereinafter simply referred to as a general image, and the general image can also be indicated by the reference numeral IM2). For example, the second image IM2 can be a television video, an internet video, a video game or a playback file video.

Because the general image is not related to an operation of a vehicle, is provided by a passenger's choice, and attracts a driver's attention, the general image can be a distraction to the driver. Therefore, the second image IM2 does not need to be seen to the driver. Because the second image IM2 has the narrow viewing angle which is visible only to a passenger, a driver cannot see the second image IM2, and only a passenger can see the second image IM2. Accordingly, the 7th to 12th light emitting areas EA7 to EA12 can be the privacy mode areas.

Figure 7B:
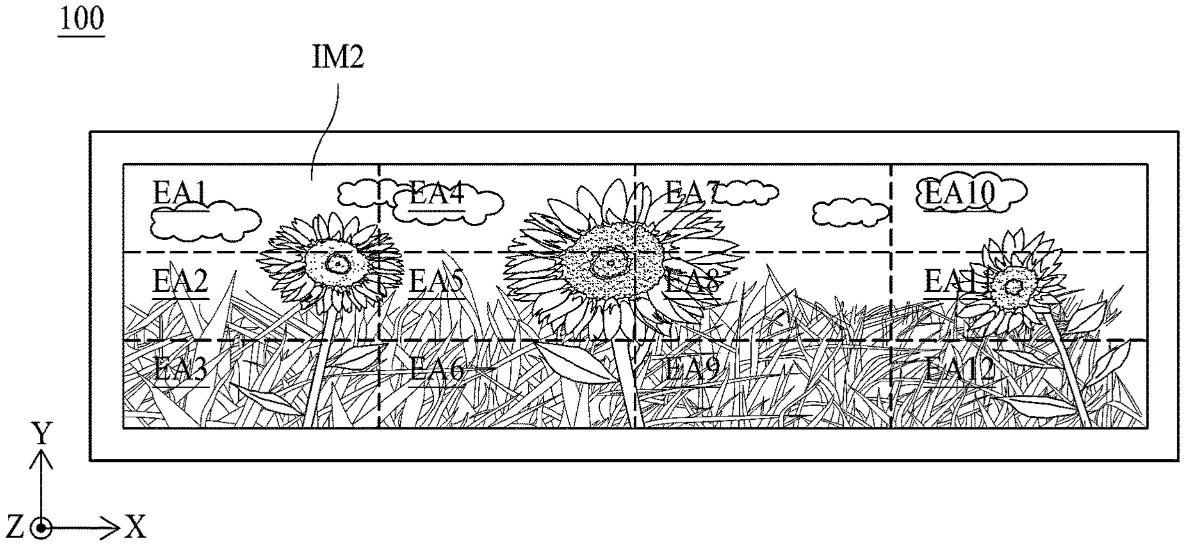

Referring to FIG. 7B, when a vehicle is parked or not operated, the first to 12th light emitting areas EA1 to EA12 can provide a driver and a passenger with the second image IM2 having the wide viewing angle in the left and right directions based on a user's choice.

Figure 7C:
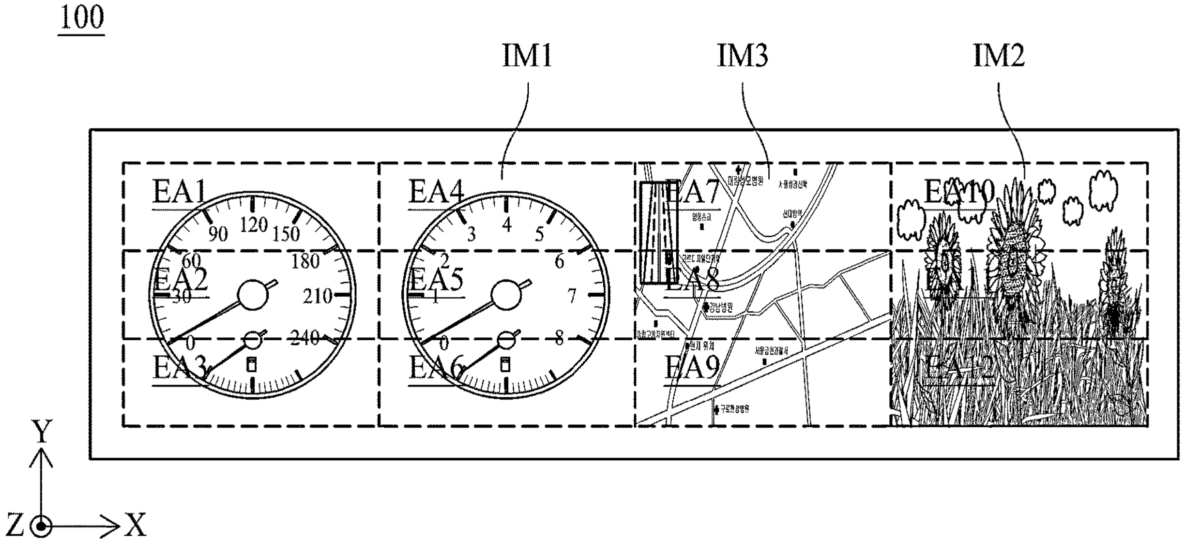

Referring to FIG. 7C, the 7th to 12th light emitting areas EA7 to EA12 can be divided based on a user's choice. In this situation, the 7th to 9th light emitting areas EA7 to EA9 can provide a third image IM3 having the wide viewing angle in the left and right directions to a driver and a passenger of a passenger seat, and the 10th to 12th light emitting areas EA10 to EA12 can provide the second image IM2 with a narrow viewing angle to be visible by only the passenger.

The third image IM3 can denote an image which provides auxiliary information related to an operation of a vehicle (hereinafter simply referred to as a vehicle operation information auxiliary image, and the vehicle operation information auxiliary image can also be indicated by the reference numeral IM3). For example, as illustrated in FIG. 7C, the third image IM3 can provide location information (e.g., navigation information).

The vehicle operation information auxiliary image IM3 needs to be seen not only to a driver but also to a passenger. Because the third image IM3 has the wide viewing angle, both a driver and a passenger can see the third image IM3. Accordingly, the 7th to 9th light emitting areas EA7 to EA9 can be the share mode areas, and the 10th to 12th light emitting areas EA10 to EA12 can be the privacy mode areas.

Figure 7D:
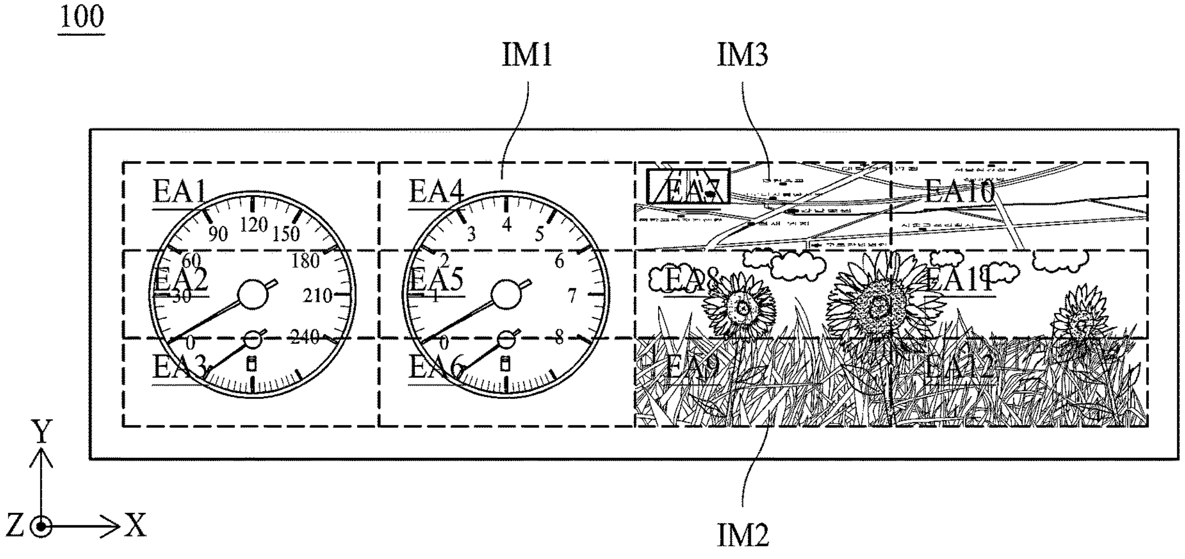

Referring to FIG. 7D, the third image IM3 can be displayed through the 7th light emitting area EA7 and the 10th light emitting area EA10, and the second image IM2 can be displayed through the 8th light emitting area EA8, the 9th light emitting area EA9, the 11th light emitting area EA11, and the 12th light emitting area EA12.

That is, in a light emitting display apparatus according to an embodiment of the present disclosure, the share mode area and the privacy mode area can be changed along the first direction X of the light emitting display panel, as illustrated in FIGS. 7A to 7C, and can be changed along the second direction Y of the light emitting display panel, as illustrated in FIG. 7D.

Figure 7E:
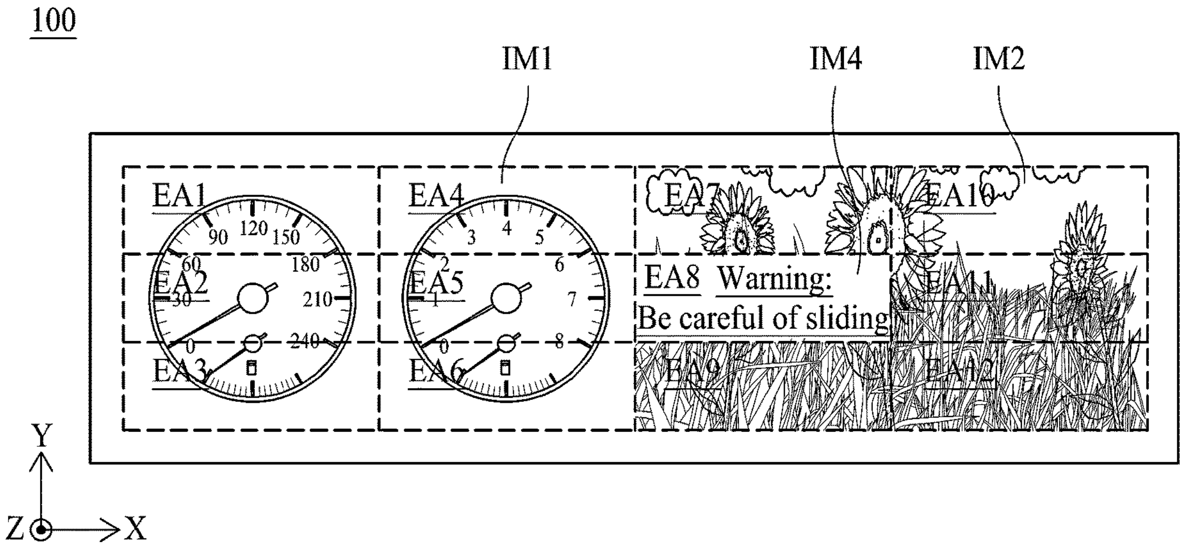

Finally, at least one of the 7th to 12th light emitting areas EA7 to EA12, which were driven as privacy mode areas in FIG. 7A, can be changed to the share mode area to display the fourth image IM4. For example, as illustrated in FIG. 7E, only the 8th light emitting area EA8 can be changed to the share mode area to display the fourth image IM4 (e.g., for providing a warning or a notification, etc.).

The fourth image IM4 can denote an image which provides emergency information related to an operation of a vehicle (hereinafter simply referred to as an emergency information image, and the emergency information image can also be indicated by the reference numeral IM4). For example, as illustrated in FIG. 7E, the fourth image IM4 can be an image indicating that there is a dangerous object in front of a vehicle. The emergency information images IM4 can be collected through various sensors mounted on a vehicle. Furthermore, the emergency information image IM4 can be a disaster message provided by the government or local governments to citizens across the country or in a specific region through various communication networks, or can be an image provided through a navigation system mounted in a vehicle.

Figure 7F:
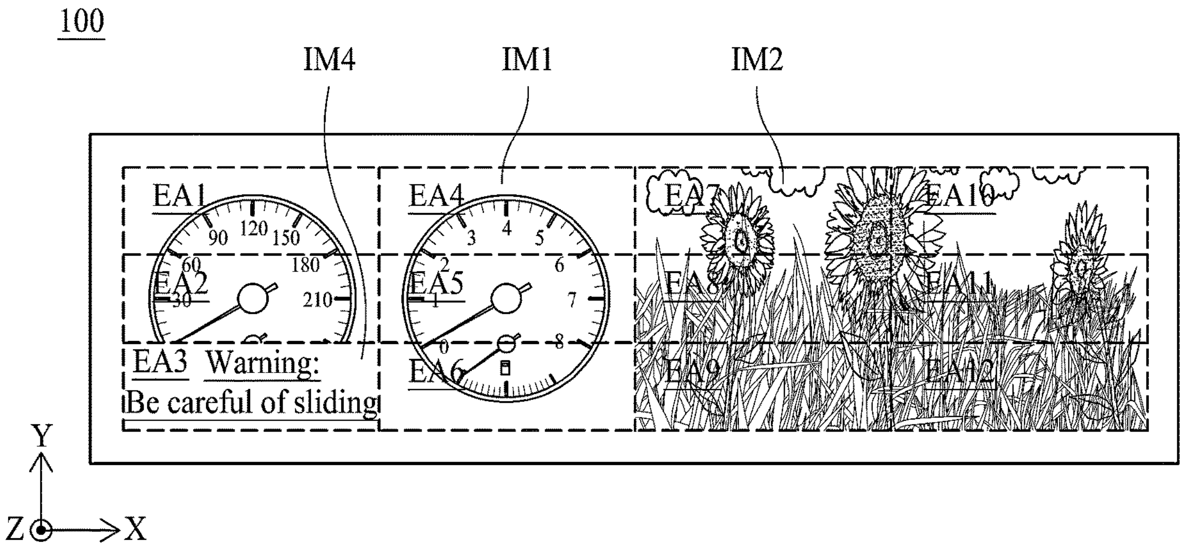

However, as illustrated in FIGS. 7A and 7F, the fourth image IM4 can be displayed through at least one (e.g., the third light emitting area EA3 at the lower left corner) of the first to 6th light emitting areas EA1 to EA6 which are driven in the share mode area.

A specific method of changing or switching between the share mode area and the privacy mode area will be described below with reference to FIG. 14.

A light emitting display apparatus 10 according to an embodiment of the present disclosure is not limited to the light emitting display apparatus for a vehicle as described above, and thus can be applied to various light emitting display apparatus such as a light emitting display apparatus for a mobile, a light emitting display apparatus for an IT device, and a light emitting display apparatus for TV.

Figure 8:
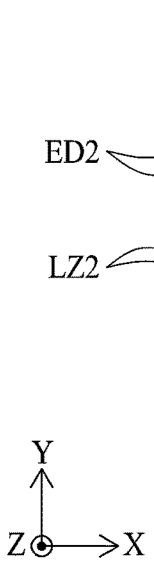
FIG. 8 is an example plan view schematically illustrating a structure of a subpixel of a light emitting display panel according to an embodiment of the present disclosure.
Figure 9A:
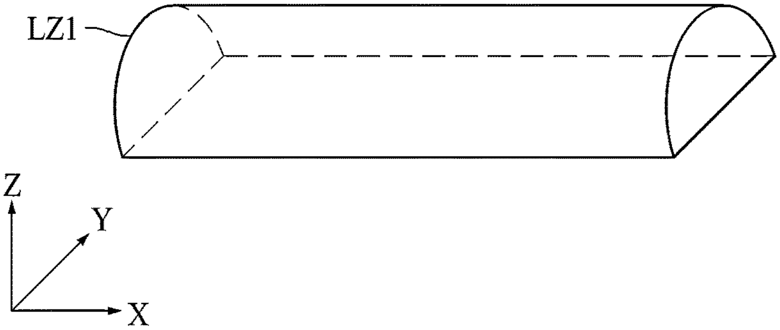
FIGS. 9A and 9B are example perspective views illustrating structures of a first lens and a second lens of a subpixel applied to a light emitting display panel according to an embodiment of the present disclosure.
Figure 9B:
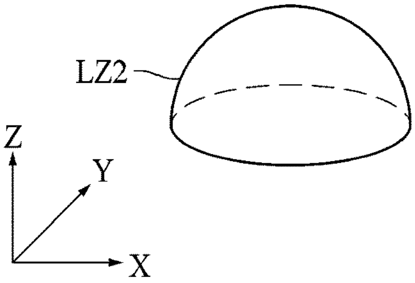

FIG. 8 is an example plan view schematically illustrating a structure of a subpixel of a light emitting display panel according to an embodiment of the present disclosure, and FIGS. 9A and 9B are example perspective views illustrating structures of a first lens and a second lens of a subpixel applied to a light emitting display panel according to an embodiment of the present disclosure.

As illustrated in FIG. 8, a subpixel P applied to a light emitting display panel according to an embodiment of the present disclosure can includes a first light emitting device ED1, a second light emitting device ED2, a first lens LZ1 disposed on the first light emitting device ED1, and a second lens LZ2 disposed on the second light emitting device ED2. For example, the first lens LZ1 can have a semi-cylindrical shape or a rectangular shape in a plan view, and the second lens LZ2 can have a hemispherical shape or a dome shape.

The first lens LZ1 can be disposed on a light traveling path of the first light emitting device ED1. The second lens LZ2 can be disposed on a light traveling path of the second light emitting device ED2. Here, the light traveling path can be, for example, a third direction Z vertical to the first direction X and the second direction Y. For example, the first lens LZ1 and the first light emitting device ED1 can be provided along the third direction Z, and the second lens LZ2 and the second light emitting device ED2 can be provided along the third direction Z.

The subpixel P can include at least two second light emitting devices ED2, and the second lens LZ2 can be provided on the light traveling path of each of the at least two second light emitting devices ED2. The at least two second light emitting devices ED2 can share one first electrode (e.g., an anode) in the subpixel P.

In the subpixel P, an area where the first lens LZ1 is disposed can be referred to as a first lens area, and an area where the second lens LZ2 is disposed can be referred to as a second lens area.

As illustrated in FIG. 9A, the first lens LZ1 can be a half-cylindrical lens elongated in the first direction X. As illustrated FIG. 9B, the second lens LZ2 can be a half-spherical lens. However, the shape of the first lens LZ1 and the shape of the second lens LZ2 can be variously changed.

In the following description, the first direction X can be expressed in a left-right direction, a widthwise direction, a horizontal direction, or an X-axis direction. The second direction Y can be expressed in an up-down direction, a lengthwise direction, a vertical direction or a Y axis direction. The third direction Z can be expressed in a front-rear direction, a thickness direction of a light emitting display panel 100, or a Z-axis direction.

The first lens LZ1 and the second lens LZ2 can differently control (limit) a viewing angle in the left-right direction X and can equally control (limit) a viewing angle in the up-down direction Y.

For example, because the first lens LZ1 does not limit a traveling path of a light emitted from the first light emitting device ED1 within a specific angle in the left-right direction X, the first lens LZ1 can control a viewing angle to the wide viewing angle. The second lens LZ2 can control a viewing angle to be the narrow viewing angle by limiting a traveling path of a light emitted from the second light emitting device ED2 within a specific angle in the left-right direction X.

Both the first lens LZ1 and the second lens LZ2 can control a viewing angle to be the narrow viewing angle by limiting a light traveling path within a specific angle in the up-down direction Y. Accordingly, in a situation when a light emitting display apparatus 10 is applied to a vehicle as illustrated in FIG. 6, a driver's view is prevented from being disturbed by images which is displayed on the light emitting display panel 100 to be reflected by a front glass of a vehicle, and safety and convenience can be improved.

When the first light emitting device ED1 is driven in the subpixel P, the subpixel P can operate in the wide viewing angle mode which does not limit a viewing angle in the left-right direction X.

When the second light emitting device ED2 is driven in the subpixel P, the subpixel P can operate in the narrow viewing angle mode which limits a viewing angle in the left-right direction X. The wide viewing angle mode can be described as a first mode (e.g., share mode), and the narrow viewing angle mode can be described as a second mode (e.g., privacy mode).

In addition, by switching the driving of the first light emitting device ED1 and the second light emitting device ED2 of the subpixel P, the subpixel P can be switched between the wide viewing angle mode and the narrow viewing angle mode.

To provide an additional description, as described above, the first light emitting unit can include the first light emitting device ED1 driven by the first viewing angle control transistor Tvc1 and the first lens LZ1 disposed on the first light emitting device, and the second light emitting unit can include the second light emitting device ED2 driven by the second viewing angle control transistor Tvc2 and the second lens LZ2 disposed on the second light emitting device.

In this situation, only the first light emitting units or only the second light emitting units can be driven in each of the light emitting areas EA1 to EA12 at a time. For example, in each of the light emitting areas, only the first light emitting device ED1 provided in the first light emitting unit can be driven, or only the second light emitting device ED2 provided in the second light emitting unit can be driven, depending on the selected mode. Accordingly, in each of the light emitting areas EA, only light having the wide viewing angle can be output through the first lens LZ1, or only light having the narrow viewing angle can be output through the second lens LZ2.

Accordingly, each of the light emitting areas can be the wide viewing angle mode area or the narrow viewing angle mode area.

Moreover, because the viewing angles of the light emitting areas can be controlled independently, the light emitting area can be the wide viewing angle mode area or the narrow viewing angle mode area, regardless of the position of the light emitting area.

Figure 10:
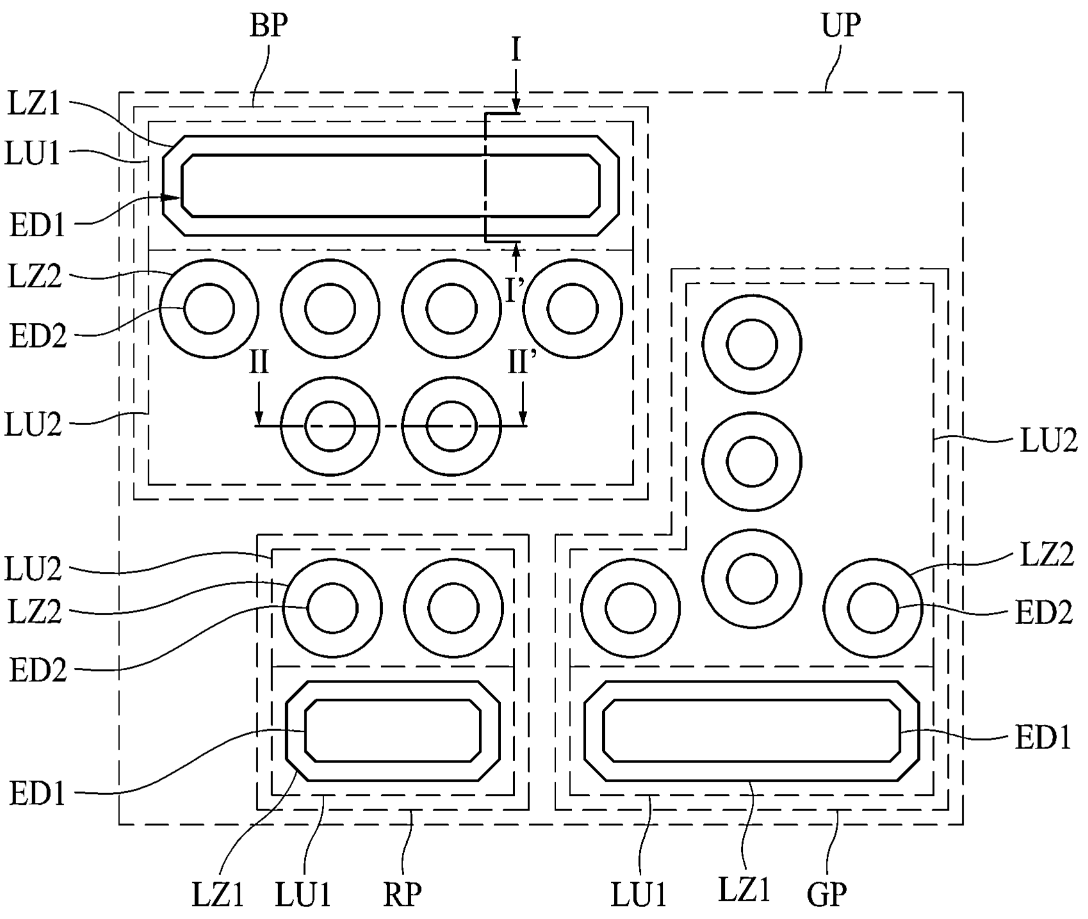
FIG. 10 is an example plan view illustrating a structure of three subpixels applied to a light emitting display panel according to an embodiment of the present disclosure.
Figure 11:
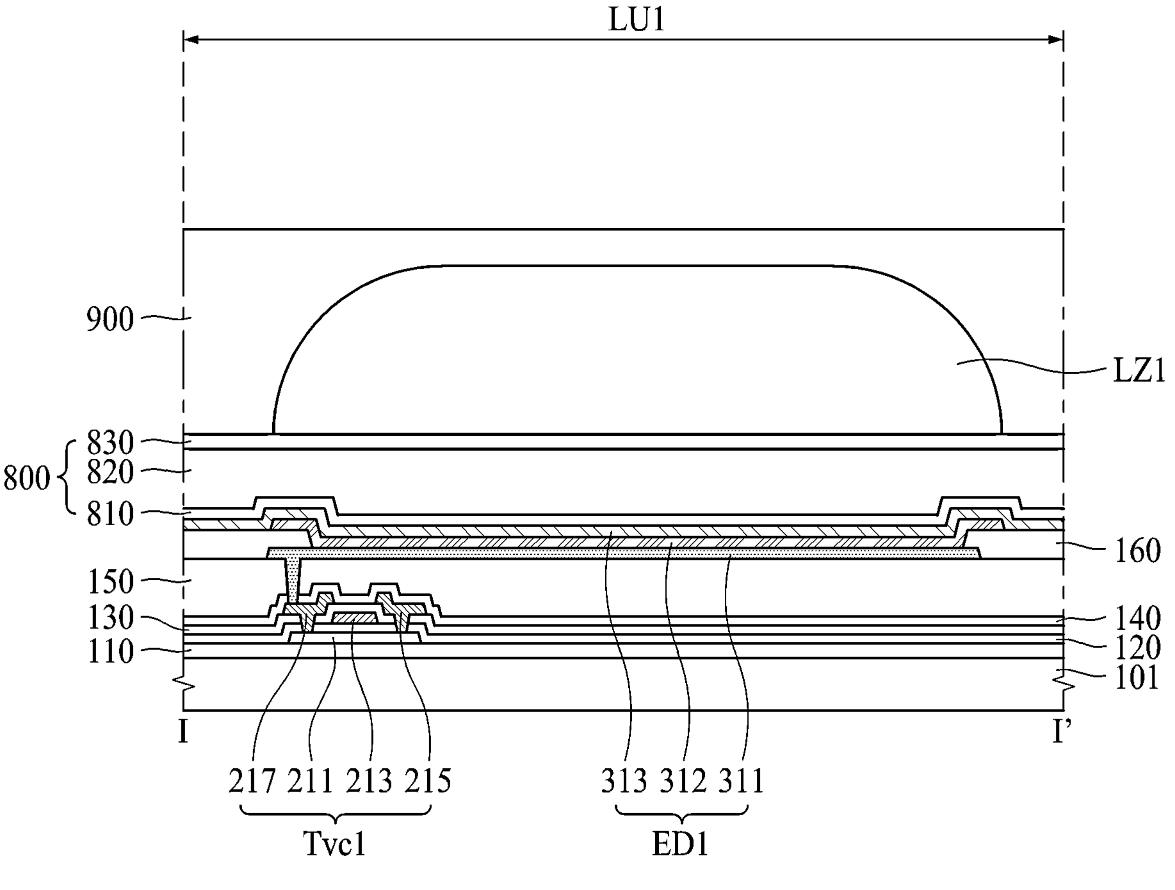
FIG. 11 is an example cross-sectional view taken along line I-I' illustrated in FIG. 10 according to an embodiment of the present disclosure.
Figure 12:
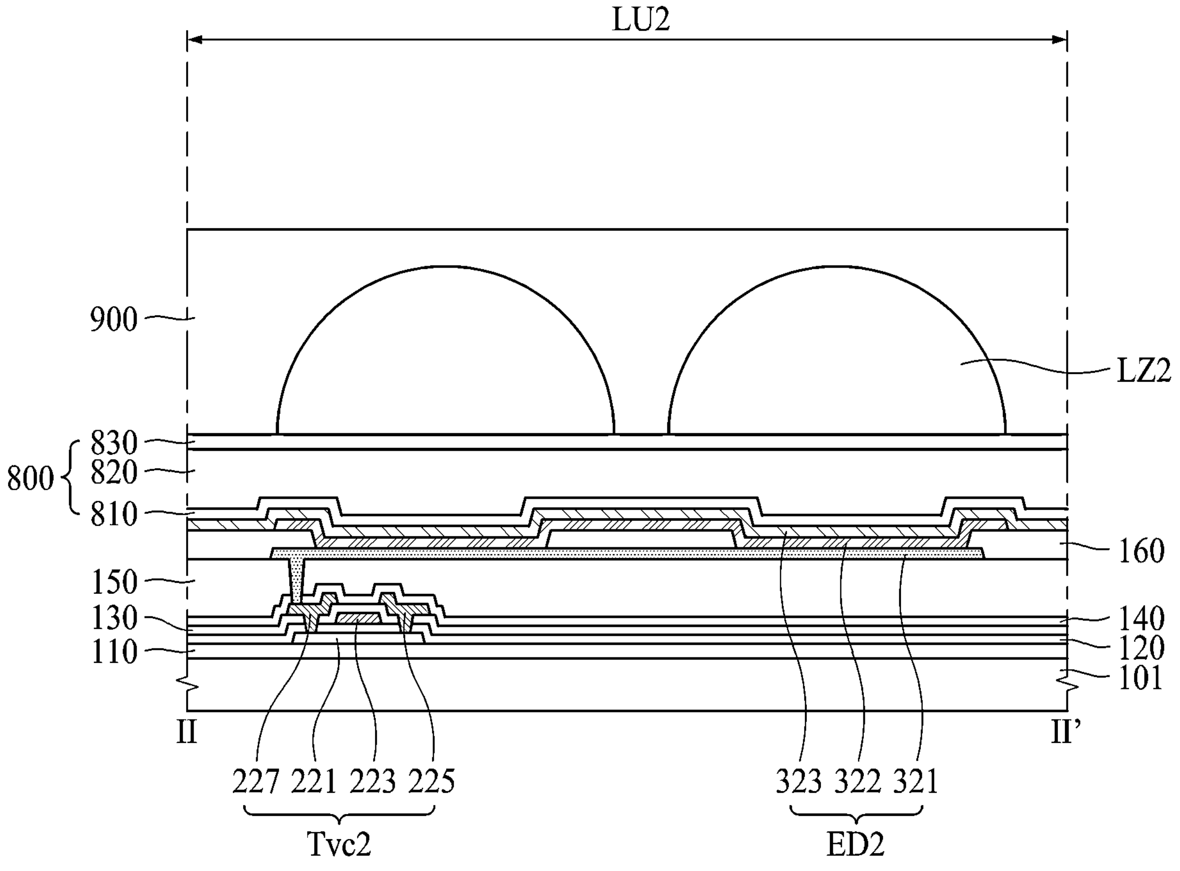
FIG. 12 is an example cross-sectional view taken along line II-II' illustrated in FIG. 10 according to an embodiment of the present disclosure.

FIG. 10 is an example plan view illustrating a structure of three subpixels applied to a light emitting display panel according to an embodiment of the present disclosure, FIG. 11 is an example cross-sectional view taken along line I-I' illustrated in FIG. 10, and FIG. 12 is an example cross-sectional view taken along line II-II' illustrate in FIG. 10.

Particularly, FIG. 10 illustrates three subpixels BP, RP, and GP configuring a unit pixel UP, FIG. 11 illustrates a cross-sectional surface of the first light emitting unit LU1, and FIG. 12 illustrates a cross-sectional surface of the second light emitting unit. LU2.

For example, the unit pixel UP capable of outputting white light can include a blue subpixel BP which emits blue light, a red subpixel RP which emits red light, and a green subpixel GP which emits green light, as illustrated in FIG. 10.

The blue subpixel BP can include a first light emitting unit LU1 and a second light emitting unit LU2. The first light emitting unit LU1 can include a first light emitting device ED1 driven by a first viewing angle control transistor Tvc1 and a first lens LZ1 overlapping the first light emitting device ED1. The second light emitting unit LU2 can include a second light emitting device ED2 driven by a second viewing angle control transistor Tvc2 and a second lens LZ2 overlapping the second light emitting device.

The red subpixel RP can include a first light emitting unit LU1 and a second light emitting unit LU2. The first light emitting unit LU1 can include a first light emitting device ED1 driven by a first viewing angle control transistor Tvc1 and a first lens LZ1 overlapping the first light emitting device ED1. The second light emitting unit LU2 can include a second light emitting device ED2 driven by a second viewing angle control transistor Tvc2 and a second lens LZ2 overlapping the second light emitting device.

The green subpixel GP can include a first light emitting unit LU1 and a second light emitting unit LU2. The first light emitting unit LU1 can include a first light emitting device ED1 driven by a first viewing angle control transistor Tvc1 and a first lens LZ1 overlapping the first light emitting device ED1. The second light emitting unit LU2 can include a second light emitting device ED2 driven by a second viewing angle control transistor Tvc2 and a second lens LZ2 overlapping the second light emitting device.

In each of the blue subpixel BP, red subpixel RP, and green subpixel GP, as described with reference to FIGS. 9A and 9B, the first lens LZ1 and the second lens LZ2 can differently control a viewing angle in the left-right direction X and can equally control a viewing angle in the up-down direction Y. For example, a unit pixel can include three subpixels (e.g., red, green and blue), and each of those subpixels can have two light emitting elements, such as a light emitting element for providing a wide angle view and a light emitting element for providing a narrow angle view. Also, each of the six light emitting elements within the unit pixel can be controlled from the control driver for activation. For example, the viewing angle control signal VCS having a high level or a low level can be used to selectively activate the six different light emitting elements, according to two different modes (e.g., a high level of VCS could active the sharing mode while a low level of VCS could activate the privacy mode, or vice-versa), but embodiments are not limited thereto. According to another embodiment, two separate signals from two separate signal lines can be used to control the two different types of light emitting elements.

Each of the first light emitting units LU1 of the unit pixel UP can include one first light emitting device ED1 and one first lens LZ1. Each of the second light emitting units LU2 of the unit pixel UP can include at least one second light emitting device ED2 and at least one second lens LZ2. In this situation, the at least two second light emitting devices ED2 can share a first electrode (e.g., an anode) 321, a light emitting layer 322, and a second electrode (e.g., a cathode) 323, as illustrated in FIG. 12.

The first light emitting device ED1 included in the first light emitting unit LU1 can have the same or substantially same shape as a lower surface of the first lens LZ1. The size of the first lens LZ1 can be set to be larger than the size of the first light emitting device ED1 to improve the emission efficiency of light generated from the first light emitting device ED1.

The second light emitting device ED2 included in the second light emitting unit LU2 can have the same or substantially same shape as the lower surface of the second lens LZ2. The size of the second lens LZ2 can be set to be larger than the size of the second light emitting device ED2 to improve the emission efficiency of light generated from the second light emitting device ED2.

The areas of the second light emitting devices ED2 included in the second light emitting units LU2 can be the same or substantially the same.

However, the number of second light emitting devices ED2 included in the second light emitting unit LU2 can vary for each subpixel BP, RP, and GP. For example, as illustrated in FIG. 10, the number of second light emitting devices ED2 disposed in the second light emitting unit LU2 of the blue subpixel BP can be greater than the number of the second light emitting devices ED2 disposed in the second light emitting unit LU2 of the red subpixel RP. The number of second light emitting devices ED2 disposed in the second light emitting unit LU2 of the red subpixel RP can be less than the number of the second light emitting devices ED2 disposed in the second light emitting unit LU2 of the green subpixel GP. Accordingly, the efficiency deviation of the blue subpixel BP, red subpixel RP, and green subpixel GP in the unit pixel UP can be compensated by the number of the second light emitting device ED2 disposed in the second light emitting unit LU2.

The size of the first light emitting device ED1 can be different for each subpixel P. For example, as illustrated in FIG. 10, the size of the first light emitting device ED1 of the blue subpixel BP can be larger than the size of the first light emitting device ED1 of the red subpixel RP. Moreover, the size of the first light emitting device ED1 of the red subpixel RP can be smaller than the size of the first light emitting device ED1 of the green subpixel GP. Accordingly, the efficiency deviation of the blue subpixel BP, red subpixel RP, and green subpixel GP in the unit pixel UP can be compensated by the sizes of the first light emitting devices ED1 disposed in the first light emitting units LU1.

A light emitting display panel 100 according to an embodiment of the present disclosure, as illustrated in FIGS. 11 and 12, can include a pixel driving circuit layer which includes a substrate 101 and transistors Tvc1 and Tvc2 disposed on the substrate 101, a light emitting device layer which includes light emitting devices ED1 and ED2 disposed on the pixel driving circuit layer, an encapsulation layer 800 disposed on the light emitting device layer, and a lens layer which includes lenses LZ1 and LZ2 disposed on the encapsulation layer 800.

A light emitting display panel 100 according to an embodiment of the present disclosure can further include a touch sensor layer disposed between the encapsulation layer 800 and the lens layer. A light emitting display panel 100 according to an embodiment of the present disclosure can further include a color filter layer including a color filter and a black matrix which are disposed between the touch sensor layer and the lens layer.

Hereinafter, a cross-sectional structure of a subpixel is described with reference to FIGS. 10 to 12. FIGS. 11 and 12 illustrate cross-sectional surfaces of the blue subpixel BP illustrated in FIG. 10. However, each of the red subpixel RP and the green subpixel GP can also have the cross-sectional structures illustrated in FIGS. 11 and 12.

That is, each of the subpixels BP, RP, and GP of the light emitting display panel according to an embodiment of the present disclosure can include the first light emitting unit LU1 illustrated in FIG. 11 and the second light emitting unit LU2 illustrated in FIG. 12.

As illustrated in FIG. 11, the first light emitting unit LU1 of the subpixel P can include a first viewing angle control transistor Tvc1, a first light emitting device ED1 connected to the first viewing angle control transistor Tvc1, and a first lens LZ1 disposed on the first light emitting device ED1 to overlap with the first light emitting device ED1.

As illustrated in FIG. 12, the second light emitting unit LU2 of the subpixel P can include a second viewing angle control transistor Tvc2, a second light emitting device ED2 connected to the second viewing angle control transistor Tvc2, and at least one second lens LZ2 disposed on the second light emitting device ED2 to overlap with the second light emitting device ED2.

In the light emitting display panel 100 according to an embodiment of the present disclosure, the pixel driving circuit layer disposed on the substrate 101 can include insulation layers stacked on the substrate 101. For example, the insulation layers can include a buffer layer 110, a gate insulation layer 120, an interlayer insulation layer 130, a passivation layer 140, and a planarization layer 150.

The substrate 101 can include an insulation material such as glass or plastic. The plastic substrate can be formed of a flexible material. For example, the substrate 101 can include at least one of acrylic resin, epoxy resin, siloxane resin, polyimide resin, and polyamide resin. That is, the substrate 101 can include an organic insulation material.

The buffer layer 110 can include an inorganic insulation material such as silicon oxide (SiOx), silicon nitride (SiNx), and aluminum oxide (Al2O3), and can have a single-layer or multi-layer structure. The buffer layer 110 can prevent impurities such as hydrogen from flowing into semiconductor layers 211 and 221 through the substrate 101.

Various transistors configuring the subpixel P can be provided on the buffer layer 110. For example, the first viewing angle control transistor Tvc1 and the second viewing angle control transistor Tvc2 can be disposed.

Each of the transistors provided in the subpixel P can include a gate electrode, a source electrode, and a drain electrode. In this situation, the source electrode and drain electrode are not fixed and can change depending on the voltage and current direction applied to the gate electrode. Accordingly, one of the source electrode can be referred to as a first electrode the other can be referred to as a second electrode. The transistors of the subpixel P can use at least one of polysilicon semiconductor, amorphous silicon semiconductor, and oxide semiconductor. The transistors of the subpixel P can be P-type transistors or N-type transistors, and the subpixel P can include both P-type transistors and N-type transistors.

The first viewing angle control transistor Tve1 includes a semiconductor layer 211, a gate electrode 213, a source electrode 215, and a drain electrode 217 which are disposed on an upper end of the buffer layer 110. The second viewing angle control transistor Tvc2 includes a semiconductor layer 221, a gate electrode 223, a source electrode 225, and a drain electrode 227 which are disposed on the buffer layer 110.

A gate insulation layer 120 can be disposed between the semiconductor layers 211 and 221 and the gate electrodes 213 and 223. An interlayer insulation layer 130 can be disposed between the gate electrode 213 and the source and drain electrodes 215, 217, as well as between the gate electrode 223 and the source and drain electrodes 225, 227. The source electrode 215 and drain electrode 217 of the first viewing angle control transistor Tve1 can be connected to a source region and drain region of the semiconductor layer 211 through contact holes penetrating the interlayer insulation layer 130 and the gate insulation layer 120. The source electrode 225 and drain electrode 227 of the second viewing angle control transistor Tvc2 can be connected to a source region and drain region of the semiconductor layer 221 through contact holes penetrating the interlayer insulation layer 130 and the gate insulation layer 120.

The semiconductor layers 211 and 221 can include polycrystalline silicon, an oxide semiconductor material, or low temperature polysilicon (LPTS). The semiconductor layers 211 and 221 can include at least one selected from IZO (InZnO)-based, IGO (InGaO)-based, ITO (InSnO)-based, IGZO (InGaZnO)-based, IGZTO (InGaZnSnO)-based, GZTO (GaZnSnO)-based, and GZO (GaZnO)-based, and ITZO (InSnZnO)-based oxide semiconductor materials. A light blocking layer can be further disposed under the semiconductor layers 211 and 221.

The gate insulation layer 120 can include an inorganic insulation material such as silicon oxide (SiOx) and silicon nitride (SiNx). The gate insulation layer 120 can include a material with a high dielectric constant. For example, the gate insulation layer 120 can include a high-K material such as hafnium oxide (HfO). The gate insulation layer 120 can have a multi-layer structure.

Gate lines connected to the gate electrodes 213 and 223 can be disposed on the gate insulation layer 120.

The interlayer insulation layer 130 can include an inorganic insulation material such as silicon oxide (SiOx) and silicon nitride (SiNx). The interlayer insulation layer 130 can have a multi-layer structure.

Data lines connected to the source electrodes 215 and 225 or the drain electrodes 217 and 227 and power lines can be disposed on the interlayer insulation layer 130.

A passivation layer 140 and a planarization layer 150 can be stacked on the first and second viewing angle control transistors Tvc1 and Tvc2. The passivation layer 140 can include an inorganic insulation material such as silicon oxide (SiOx) and silicon nitride (SiNx). The planarization layer 150 can include an organic insulation material different from that of the passivation layer 140 and can provide a flat surface.

A light emitting device layer including the first light emitting device ED1 and the second light emitting device ED2 can be disposed on the planarization layer 150.

The first light emitting device ED1 includes a first electrode 311 disposed on the planarization layer 150, a light emitting layer 312 disposed on the first electrode 311, and a second electrode 313 disposed on the light emitting layer 312. The second light emitting device ED2 includes a first electrode 321 disposed on the planarization layer 150, a light emitting layer 322 disposed on the first electrode 321, and a second electrode 323 disposed on the light emitting layer 322. The first light emitting device ED1 and the second light emitting device ED2 disposed in the subpixel P can emit light of the same color.

The first electrode 311 of the first light emitting device ED1 can be connected to any one of the source electrode 215 and the drain electrode 217 of the first viewing angle control transistor Tvc1 through a contact hole penetrating the planarization layer 150 and the passivation layer 140. The first electrode 321 of the second light emitting device ED2 can be connected to any one of the source electrode 225 and the drain electrode 227 of the second viewing angle control transistor Tvc2 through a contact hole penetrating the planarization layer 150 and the passivation layer 140.

The first electrodes 311 and 321 can include a conductive material with high reflectivity. The first electrodes 311 and 321 can include metal such as aluminum (Al), silver (Ag), titanium (Ti), and silver-palladium-copper (APC) alloy. The first electrodes 311 and 321 can further include a transparent conductive material such as indium tin oxide (ITO) or indium zinc oxide (IZO). For example, the first electrodes 311 and 321 can have a multi-layer structure Ti/Al/Ti of titanium (Ti) and aluminum (Al), a multi-layer structure ITO/Al/ITO of ITO and aluminum (Al), or a multi-layer structure ITO/APC/ITO of ITO and APC.

The light emitting layers 312 and 322 can include an emission material layer (EML) including a light emitting material. The light emitting material can include an organic material, an inorganic material, or hybrid material. The light emitting layer 312 of the first light emitting device ED1 and the light emitting layer 322 of the second light emitting device ED2 can be spaced apart from each other. Accordingly, light emission due to leakage current can be prevented.

The light emitting layers 312 and 322 can have a multi-layer structure. For example, the light emitting layers 312 and 322 can further include at least one of a hole injection layer (HIL), a hole transport layer (HTL), an electron injection layer (EIL).

The second electrodes 313 and 323 can include a conductive material which can transmits light therethrough. The second electrodes 313 and 323 can include a transparent conductive material such as ITO or IZO. The second electrodes 313 and 323 can include aluminum (Al), magnesium (Mg), silver (Ag), or an alloy thereof, and can have a thin thickness capable of transmitting light. Accordingly, light generated in each of the light emitting layers 312 and 322 can be emitted through the second electrodes 313 and 323.

The first electrode 311 of the first light emitting device ED1 can be spaced apart from the first electrode 321 of the second light emitting device ED2, and a bank insulation layer 160 can be provided between the first electrodes 311 and 321. The bank insulation layer 160 can cover the edge of each of the first electrodes 311 and 321. The bank insulation layer 160 can include an organic insulation material. The bank insulation layer 160 can include an organic material different from that of the planarization layer 150 and can have a single-layer or double-layer structure.

The bank insulation layer 160 can include an opening portion through which the first electrode 311 of the first light emitting device ED1 is exposed, and light can be output through the opening portion. The light emitting layer 312 and the second electrode 313 of the first light emitting device ED1 can be stacked on the first electrode 311 exposed by the opening portion of the bank insulation layer 160.

The bank insulation layer 160 can include an opening portion through which the first electrode 321 of the second light emitting device ED2 is exposed, and light can be output through the opening portion. The bank insulation layer 160 can include at least two opening portions provided on the first electrode 321, and thus, at least two second light emitting devices ED2 can be formed.

The light emitting layer 322 and the second electrode 323 of the second light emitting device ED2 can be stacked on the first electrode 321 exposed by the opening portion of the bank insulation layer 160. The light emitting layer 322 and the second electrode 323 of the second light emitting device ED2 can overlap with the first electrode 321. In the second light emitting unit LU2, at least two second light emitting devices ED2 are independently arranged and spaced apart from each other by the bank insulation layer 160, but the second light emitting devices ED2 can share the first electrode 321, the light emitting layer 322, and the second electrode 323. Accordingly, the luminous efficiency of the second light emitting devices ED2 can be improved. The size of the second light emitting device ED2 can be smaller than the size of the first light emitting device ED1.

The second electrode 313 of the first light emitting device ED1 can be a common electrode electrically connected to the second electrode 323 of the second light emitting device ED2.

An encapsulation layer 800 can be disposed on the light emitting device layer including the first light emitting device ED1 and the second light emitting device ED2. The encapsulation layer 800 can prevent the light emitting devices ED1 and ED2 from being damaged by moisture and impact from the outside. The encapsulation layer 800 can have a multi-layer structure. For example, the encapsulation layer 800 can include a first encapsulation layer 810, a second encapsulation layer 820, and a third encapsulation layer 830, but not limited thereto. The first encapsulation layer 810, the second encapsulation layer 820, and the third encapsulation layer 830 can include an insulating material. The second encapsulation layer 820 can include a material different from that of the first encapsulation layer 810 and the third encapsulation layer 830. For example, the first encapsulation layer 810 and the third encapsulation layer 830 can be inorganic encapsulation layers including an inorganic insulation material, and the second encapsulation layer 820 can include an organic encapsulation layer including an organic insulation material. Accordingly, it is possible to more effectively prevent the light emitting devices ED1 and ED2 from being damaged by moisture and impact from the outside.

A lens layer including the first lens LZ1 and the second lens LZ2 can be disposed on the encapsulation layer 800.

The first lens LZ1 can be disposed on an upper end of the first light emitting device ED1 in the first light emitting unit LU1. The first lens LZ1 does not limit the path of light generated in the first light emitting device ED1 to the left-right directions. Accordingly, the first lens LZ1 can output light having the wide viewing angle in the left-right direction. For example, the first lens LZ1 does not limit the path of light emitted from the first light emitting device ED1 to within a specific angle in the left-right direction. Accordingly, the first lens LZ1 can output light having the wide viewing angle in the left-right direction. Further, the first lens LZ1 can limit the path of light generated in the first light emitting device ED1 to within a certain angle in the up-down direction, and thus can output light having the narrow viewing angle in the up-down direction.

The second lens LZ2 can be disposed on an upper end of the second light emitting device ED2 in the second light emitting unit LU2. The second lens LZ2 limits the path of light generated in the second light emitting device ED2 to the left-right direction. Accordingly, the second lens LZ2 can output light having the narrow viewing angle in the left-right direction. For example, the second lens LZ2 limits the path of light emitted from the second light emitting device ED2 to the left-right direction. Accordingly, the second lens LZ2 can output light having the narrow viewing angle in the left-right direction. Further, the second lens LZ2 can limit the path of light generated in the second light emitting device ED2 to within a specific angle in the up-down direction, and thus can output light having the narrow viewing angle in the up-down direction.

A lens passivation layer 900 can be provided on the first lens LZ1 and the second lens LZ2 of each subpixel area. The lens passivation layer 900 can include an organic insulation material. The refractive index of the lens passivation layer 900 can be smaller than the refractive index of the first lens LZ1 and the refractive index of the second lens LZ2. Accordingly, light passing through the first lens LZ1 and the second lens LZ2 cannot be reflected toward the direction of the substrate 101.

Figure 13:
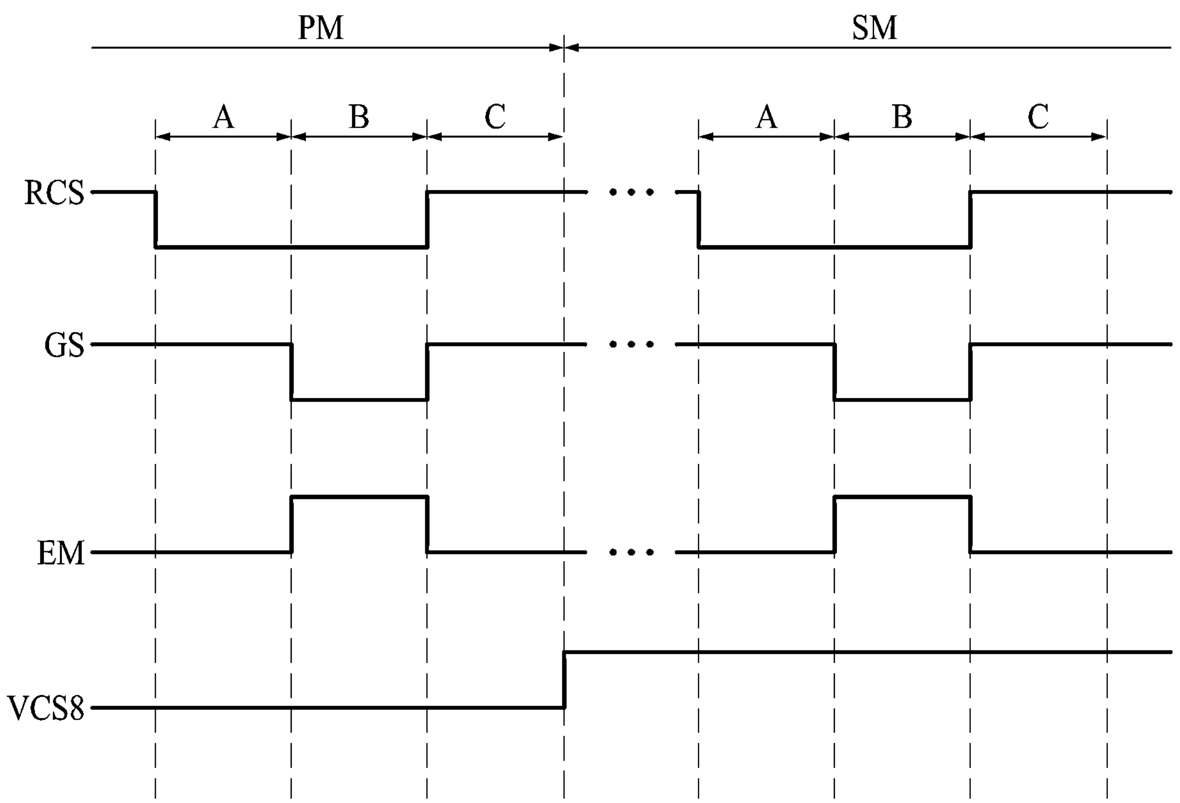
FIG. 13 is an example timing diagram for explaining an example driving method of a light emitting display apparatus according to an embodiment of the present disclosure.

FIG. 13 is an example timing diagram for explaining an example driving method of a light emitting display apparatus according to an embodiment of the present disclosure.

In a light emitting display apparatus according to the present disclosure, in a state where one of the first viewing angle control transistor Tvc1 and the second viewing angle control transistor Tvc2 provided in the subpixel P is turned on, the pixel driving circuit PDC can be driven. Accordingly, in each of the subpixels P, only the first light emitting device ED1 connected to the first viewing angle control transistor Tvc1 can output light, or only the second light emitting device ED2 connected to the second viewing angle control transistor Tvc2 can output light.

The light output from the first light emitting device ED1 can have the first viewing angle (e.g., wide viewing angle), and the light output from the second light emitting device ED2 can have the second viewing angle (e.g., narrow viewing angle).

Accordingly, an image having the first viewing angle (e.g., wide viewing angle) can be displayed in a light emitting area where light is output only from the first light emitting devices ED1, and an image having the second viewing angle (e.g., narrow viewing angle) can be displayed in a light emitting area where light is output only from the second light emitting devices ED2.

The pixel driving circuit PDC applied to a light emitting display apparatus according to the present disclosure can include the light emitting control unit ECU (e.g., light emitting control circuit) and the viewing angle control unit VCU (e.g., viewing angle control circuit), as described with reference to FIG. 2.

The viewing angle control unit VCU can include the first viewing angle control transistor Tvc1 connected to the first light emitting device ED1 and the second viewing angle control transistor Tvc2 connected to the second light emitting device ED2. A gate of the first viewing angle control transistor Tvc1 and a gate of the second viewing angle control transistor Tvc2 can be commonly connected to a viewing angle control line VCL.

In this situation, the polarity type of the first viewing angle control transistor Tvc1 and the polarity type of the second viewing angle control transistor Tvc2 can be opposite. For example, when the first viewing angle control transistor Tvc1 is an N-type transistor, as illustrated in FIG. 2, the second viewing angle control transistor Tvc2 can be a P-type transistor.

The light emitting control unit ECU can perform a function of supplying current to the first viewing angle control transistor Tvc1 or the second viewing angle control transistor Tvc2. To this end, the light emitting control unit ECU can be formed in the structure illustrated in FIG. 2, and can be changed to various structures other than the structure illustrated in FIG. 2.

Further, the driving method for turning on the driving transistor Tdr included in the light emitting control unit ECU to supply current to the first viewing angle control transistor Tvc1 or the second viewing angle control transistor Tvc2 can also be changed in various ways.

Therefore, hereinafter, an example driving method of the light emitting display apparatus according to the present disclosure will be briefly described with reference to the pixel driving circuit PDC illustrated in FIG. 2 and the timing diagram illustrated in FIG. 13.

Particularly, hereinafter, the example driving method of the light emitting display apparatus according to the present disclosure will be briefly described with reference to a 8th light emitting area EA8 which is transitioned from displaying the general image IM2 according to the privacy mode (PM) having the narrow viewing angle to the share mode (SM) where the emergency information image IM4 with the first viewing angle (e.g., wide viewing angle) is output, as illustrated in FIG. 7E.

First, for example, when the 8th light emitting area EA8 is driven in the privacy mode (PM), a viewing angle control signal VCS having a low level can be supplied to the subpixels P provided in the 8th light emitting area EA8, as illustrated in FIG. 13. In FIG. 2, n can be 8, and thus, an 8th viewing angle control signal VCS8 having a low level can be supplied to the subpixels P provided in the 8th light emitting area EA8.

The first viewing angle control transistors Tvc1 and the second viewing angle control transistors Tvc2 provided in the subpixels P of the 8th light emitting area EA8 can be connected to one viewing angle control line VCL, for example, an 8th viewing angle control line VCL8. In other words, the first viewing angle control transistors Tvc1 and the second viewing angle control transistors Tvc2 can be connected to the same viewing angle control line VCL and be separately activated based on different signal levels.

In this situation, as illustrated in FIG. 2, the first viewing angle control transistor Tvc1 provided in the subpixels P can be an N-type transistor, and the second viewing angle control transistor Tvc2 can be a P-type transistor.

Accordingly, while the 8th light emitting area EA8 is driven in the privacy mode (PM), the first viewing angle control transistors Tvc1 provided in the subpixels P of the 8th light emitting area EA8 can be turned off by the 8th viewing angle control signal VCS8 having a low level, and the second viewing angle control transistors Tvc2 provided in the subpixels P of the 8th light emitting area EA8 can be turned on by the 8th viewing angle control signal VCS8 having a low level.

Next, as illustrated in FIG. 13, when a reference control signal RCS having a low level, a gate signal GS having a high level, and an emission signal EM having a low level are supplied to a kth (k is a natural number less than or equal to g) pixel row line provided in the 8th light emitting area EA8, the first emission transistor Tsw4*a*, the emission transistor Tsw4*b*, the first reference transistor Tsw2*a*, the second reference transistor Tsw2*b*, and the connection transistor Tsw3 which are provided in the subpixel P of the kth pixel row line can be turned on, and the switching transistor Tsw1 can be turned off. Here, the kth pixel row line can denote a pixel row line provided in the 8th light emitting area EA8, and particularly, the kth pixel row line can denote the subpixels provided along the first direction X in the 8th light emitting area EA8.

Accordingly, through the first emission transistor Tsw4*a*, the second emission transistor Tsw4*b*, the first reference transistor Tsw2*a*, the second reference transistor Tsw2*b*, and the connection transistor Tsw3, a reference voltage VREF can be supplied to the gate of the driving transistor Tdr, the first electrode (anode) of the first light emitting device ED1, and the first electrode (anode) of the second light emitting device ED2.

Therefore, the gate of the driving transistor Tdr, the first electrode (anode) of the first light emitting device ED1, and the first electrode (anode) of the second light emitting device ED2 can be initialized by the reference voltage VREF.

If the second terminal of the first reference transistor Tsw2*a* is connected to the first terminal of the first viewing angle control transistor Tvc1 and the second terminal of the second reference transistor Tsw2*b* is connected to the first terminal of the second viewing angle control transistor Tvc2, because the first viewing angle control transistor Tvc1 is turned off, the second light emitting device ED2 can only be initialized by the reference voltage VREF transmitted through the second reference transistor Tsw2*b* and the second viewing angle control transistor Tvc2.

Hereinafter, a period during which the reference control signal RCS having the low level, the gate signal GS having the high level, and the emission signal EM having the low level is supplied to the kth pixel row line provided in the 8th light emitting area EA8 is referred to as an initialization period A.

Next, after the initialization period A, a sampling period B begins.

In the sampling period B, as illustrated in FIG. 13, when the reference control signal RCS having the low level, the gate signal GS having the low level, and the emission signal EM having the high level are supplied to the kth pixel row line provided in the 8th light emitting area EA8, the switching transistor Tsw1, the first reference transistor Tsw2*a*, the second reference transistor Tsw2*b*, and the connection transistor Tsw3 which are provided in the subpixel connected to the kth pixel row line can be turned on and the first emission transistor Tsw4*a* and the second emission transistor Tsw4*b* can be turned off. In this situation, the driving transistor Tdr can also be turned on. Because the second emission transistor Tsw4*b* is turned off, even if the driving transistor Tdr is turned on, current is not supplied to the second light emitting device ED2 through the second viewing angle control transistor Tvc2.

Accordingly, the data voltage Vdata transmitted through the data line DL can be charged to the first terminal of the storage capacitor Cst through the switching transistor Tsw1.

In this situation, the gate of the driving transistor Tdr, which is the second terminal of the storage capacitor Cst, can be charged with the first voltage EVDD and the threshold voltage (Vth) of the driving transistor Tdr.

Next, after the sampling period B, an emission period C begins.

In the emission period C, as illustrated in FIG. 13, when the reference control signal RCS having the high level, the gate signal GS having the high level, and the emission signal EM having the low level are supplied to the kth pixel row line provided in the 8th light emitting area EA8, the switching transistor Tsw1, the first reference transistor Tsw2*a*, the second reference transistor Tsw2*b*, and the connection transistor Tsw3 which are provided in the subpixel P connected to the kth pixel row line can be turned off, and the first emission transistor Tsw4*a* and the second emission transistor Tsw4*b* can be turned on.

Accordingly, the first terminal of the storage capacitor Cst can be charged with the reference voltage VREF.

In this situation, a gate voltage (Vg) can be supplied to the gate of the driving transistor Tdr, which is the second terminal of the storage capacitor Cst (e.g., Vg=VREF−Vdat+ELVDD+Vth). A source voltage (Vs) (e.g., Vs=ELVDD) can be supplied to a source of the driving transistor Tdr.

A level of a current flowing through the driving transistor Tdr to the first light emitting device ED1 or the second light emitting device ED2 can be proportional to the square of a voltage obtained by subtracting the threshold voltage (Vth) of the driving transistor Tdr from a difference voltage (hereinafter simply referred to as a gate-source voltage (Vgs)) between the gate voltage Vg and the source voltage Vs of the driving transistor Tdr.

In the above example, a value (Vgs−Vth) obtained by subtracting the threshold voltage (Vth) of the driving transistor Tdr from the gate-source voltage (Vgs) does not include the threshold voltage (Vth) of the driving transistor Tdr, and can include the data voltage Vdata and the reference voltage VREF (e.g., Vgs−Vth=[Vref−Vdat+ELVDD+Vth]−[ELVDD]−[Vth]=VREF−Vdat). Here, the reference voltage VREF is a constant voltage regardless of the threshold voltage (Vth) of the driving transistor Tdr.

Therefore, the threshold voltage (Vth) of the driving transistor Tdr does not affect the level of the current flowing through the driving transistor Tdr, and the data voltage Vdata and reference voltage VREF can affect the level of the current flowing through the driving transistor Tdr.

Accordingly, even when the driving transistor Tdr deteriorates and thus the threshold voltage (Vth) of the driving transistor Tdr changes, the first light emitting device ED1 or the second light emitting device ED2 can output light with a luminance corresponding to the data voltage Vdata.

In this situation, because only the second viewing angle control transistor Tvc2 connected to the second light emitting device ED2 is turned on by the 8th viewing angle control signal VCS8 having the low level in the privacy mode (PM), only lights having the second viewing angle (e.g., narrow viewing angle) can be output from the subpixels P of the kth pixel row line provided in the 8th light emitting area EA8.

That is, lights having the second viewing angle can be output from the subpixels P provided in the 8th light emitting area EA8, and thus, as illustrated in FIG. 7A. the general image IM2 having the second viewing angle (e.g., narrow viewing angle or privacy mode) can be displayed in the 8th light emitting area EA8.

The general image IM2 having the second viewing angle (e.g., narrow viewing angle) can be visible only to a user at a specific location, e.g., a passenger. Accordingly, this mode can be the privacy mode (PM), as described above. In this way, a passenger seated next to the driver can comfortably watch or view content while in the second mode (e.g., privacy viewing mode) without disturbing the driver, since it can display content with a narrow viewing angle.

The processes described above can be repeated in all pixel row lines provided in the 8th light emitting area EA8 while the 8th viewing angle control signal VCS8 having the low level is supplied to the 8th light emitting area EA8.

Next, if the emergency information image IM4 with the first viewing angle (e.g., wide viewing angle) is received while displaying content in the privacy mode (PM) in which the general image IM2 with the second viewing angle (e.g., narrow viewing angle) is displayed, the control driver 400 can supply the 8th viewing angle control signal VCS8 having the high level to the subpixels P provided in the 8th light emitting area EA8, as illustrated in FIG. 13, in order to transition the 8th light emitting area EA8 from the narrow viewing angle to the wide viewing angle to display the emergency information so it is viewable by both the driver and the passenger.

The first viewing angle control transistors Tvc1 and the second viewing angle control transistors Tvc2 provided in the subpixels P of the 8th light emitting area EA8 can be connected to the 8th viewing angle control line VCL8.

In this situation, as illustrated in FIG. 2, the first viewing angle control transistor Tvc1 provided in the subpixels P can be an N-type transistor, and the second viewing angle control transistor Tvc2 can be a P-type transistor.

Accordingly, the first viewing angle control transistors Tve1 provided in the subpixels P of the 8th light emitting area EA8 can be turned on by the 8th viewing angle control signal VCS8 having the high level, and the second viewing angle control transistors Tvc2 can be turned off by the 8th viewing angle control signal VCS8 having the high level.

Next, the initialization period A and the sampling period B can be performed for the kth pixel row line provided in the 8th light emitting area EA8.

That is, for the kth pixel row line, the same initialization period A and sampling period B as the initialization period A and sampling period B described in the privacy mode (PM) can proceed.

Accordingly, the driving transistor Tdr provided in the kth pixel row line can be initialized, and the data voltage Vdata can be supplied to the subpixel P.

Finally, after the sampling period B, the emission period C begins.

In the emission period C, as illustrated in FIG. 13, when the reference control signal RCS having the high level, the gate signal GS having the high level, and the emission signal EM having the low level are supplied to the kth pixel row line provided in the eighth light emitting area EA8, the switching transistor Tsw1, the first reference transistor Tsw2*a*, the second reference transistor Tsw2*b*, and the connection transistor Tsw3 which are provided in the subpixel P connected to the kth pixel row line can be turned off, and the first emission transistor Tsw4*a* and the second emission transistor Tsw4*b* can be turned on.

Accordingly, current flows through the driving transistor Tdr toward the first viewing angle control transistor Tvc1 and the second viewing angle control transistor Tvc2.

In this situation, in the share mode (SM), because only the first viewing angle control transistor Tvc1 connected to the first light emitting device ED1 is turned on by the 8th viewing angle control signal VCS8 having the high level, only lights having the first viewing angle (e.g., wide viewing angle) can be output from the subpixels P connected to the kth pixel row line provided in the 8th light emitting area EA8.

That is, lights having the first viewing angle can be output from the subpixels P provided in the 8th light emitting area EA8, and thus, the emergency information image IM4 having the first viewing angle (e.g., wide viewing angle) can be displayed in the 8th light emitting area EA8, as illustrated in FIG. 7E.

The emergency information image IM4 having the first viewing angle (e.g., wide viewing angle) can be seen by users at any location, e.g., a driver and a passenger. Accordingly, this mode can be the share mode (SM), as described above.

That is, the mode of the 8th light emitting area EA8 can be changed from the privacy mode (PM) to the share mode (SM) through the method described above.

The mode of each of the remaining light emitting areas can also be changed from the privacy mode (PM) to the share mode (SM), or changed from the share mode (SM) to the privacy mode (PM) through the same method as described above. Also, each of the light emitting areas can be individually switched between the privacy mode (PM) to the share mode (SM), on a pixel block-by-pixel block basis (e.g., a light emitting area by light emitting area basis). For example, each of light emitting areas (e.g., pixel-blocks) can be selectively driven in the first mode (e.g., share mode) or the second mode (e.g., privacy mode) by the controller. Therefore, within the display area, only a localized area in which images or private contents requiring privacy protection are displayed can be displayed at the narrow viewing angle. In this way, a driver and a passenger can both share and view wide viewing angle content on a same screen, but a small portion of the screen can be activated within the second mode (e.g., privacy viewing mode) in an area of the screen that is in front of the passenger to provide sensitive information with a narrow viewing angle, such as personal notifications, or to provide information that is only relevant to the passenger in order to not distract the driver, but embodiments are not limited thereto. For example, the screen can be any type of display device, such as a TV, monitor, smart phone, tablet, etc.

In addition, according to an embodiment of the present disclosure, a user can be viewing the display device while in public in which most content is displayed in the first mode (e.g., share mode) with a wide viewing angle, but the user can select certain types of sensitive information to only be displayed on a small portion or selective portion of the screen according to the second mode (e.g., privacy mode) with a narrow viewing angle, such as personal messages or other notifications, etc. In this way, a user can privately view sensitive information while preventing other nearby people from seeing such information (e.g., coworkers, strangers, etc.).

Also, since each individual pixel block or light emitting area can be selectively controlled to operate in the first mode (e.g., share mode) and the second mode (e.g., privacy mode) on a pixel block by pixel block basis, a user can have the freedom to selectively designate any specific area on the screen as a type of "secret" display area or "special" display area for displaying sensitive information in a narrow viewing angle mode, while the remainder of the screen can operate in a wide viewing angle mode that can be viewed by both the driver and the passenger.

In addition, according to an embodiment, a shared screen can be used by two or more video game players and different portions of the screen can be operated in the first mode (e.g., share mode) or the second mode (e.g., privacy mode) so that some content can be seen by all players while also providing specific content to individual players in an area of the screen that is directly in front of that specific player, etc.

Figure 14:
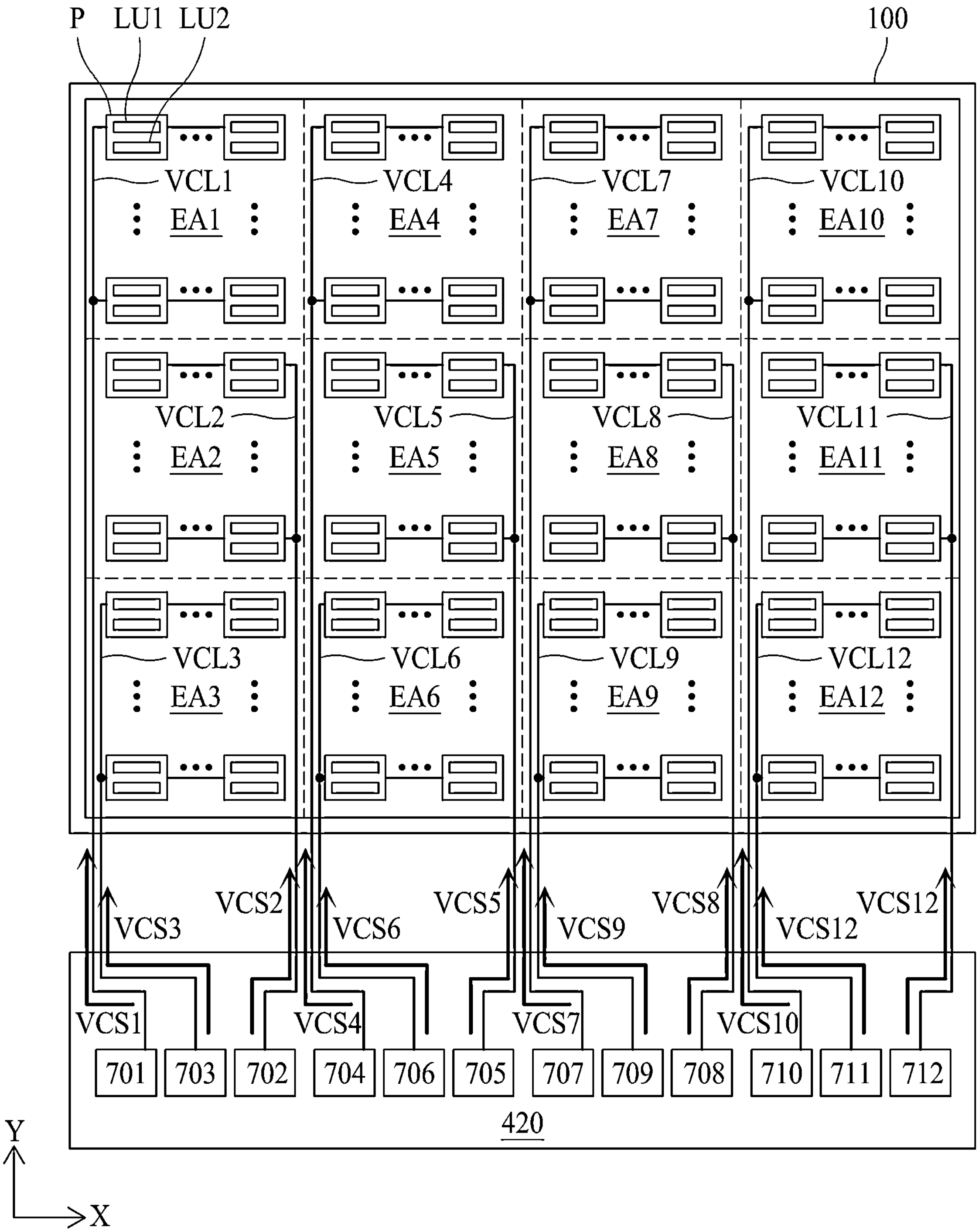
FIG. 14 is an example diagram illustrating a connection structure of light emitting areas and viewing angle control lines in a light emitting display apparatus according to an embodiment of the present disclosure.

FIG. 14 is an example diagram illustrating a connection structure of light emitting areas and viewing angle control lines in a light emitting display apparatus according to an embodiment of the present disclosure. In the following description, details which are the same as or similar to details described with reference to FIGS. 1 to 13 are omitted or will be briefly described.

Hereinafter, a method in which only the first light emitting units LU1 or only the second light emitting units LU2 are driven in each of the light emitting areas will be described with reference to FIGS. 1 to 14.

As described above, the first viewing angle control transistor Tvc1 can be connected between the driving transistor Tdr, which controls the level of the current supplied to the first light emitting unit LU1 (or the second light emitting unit LU2) and the first light emitting unit LU1, and the second viewing angle control transistor Tvc2 can be connected between the driving transistor Tdr and the second light emitting unit LU2. In this situation, as illustrated in FIG. 2, the second emission transistor Tsw4*b* for controlling the light emitting timing of the first light emitting device ED1 (or the second light emitting device ED2) can be further provided between the driving transistor Tdr and the first viewing angle control transistor Tvc1 (or the second viewing angle control transistor Tvc2).

The first light emitting unit LU1 can include the first light emitting device ED1 driven by the first viewing angle control transistor Tvc1 and the first lens LZ1 disposed on the first light emitting device ED1. Also, the second light emitting unit LU2 can include the second light emitting device ED2 driven by the second viewing angle control transistor Tvc2 and the second lens LZ2 disposed on the second light emitting device ED2.

The display area DA of the light emitting display panel 100 can be divided into at least two light emitting areas along the first direction X, and the display area DA can be divided into at least two light emitting areas along the second direction Y different from the first direction X. For example, a light emitting display panel 100 which is divided into four light emitting areas along the first direction X and divided into three light emitting areas along the second direction Y is illustrated in FIGS. 1 and 14. That is, a light emitting display panel 100 divided into 12 light emitting areas EA1 to EA12 is illustrated in FIGS. 1 and 14. However, embodiments are not limited thereto, and more than 12 or less than 12 light emitting areas can be provided, according to design considerations.

In this situation, gates of the first viewing angle control transistors Tvc1 and gates of the second viewing angle control transistors Tvc2 which are provided in a sth light emitting area among the light emitting areas can be connected to a sth viewing angle control line to which a sth viewing angle control signal is supplied. Also, gates of the first viewing angle control transistors Tvc1 and gates the second viewing angle control transistors Tvc2 which are provided in a s+1th light emitting area among the light emitting areas can be connected to a s+1th viewing angle control line to which a s+1th viewing angle control signal is supplied. Here, s is a natural number smaller than the number of the light emitting areas provided in the light emitting display panel 100. For example, in the light emitting display panel 100 illustrated in FIG. 14, the s can be any natural number from 1 to 11.

Moreover, the sth viewing angle control line and the s+1th viewing angle control line can be connected to the control driver 400 which generates the sth viewing angle control signal and the s+1th viewing angle control signal.

For example, gates of the first viewing angle control transistors Tvc1 and gates of the second viewing angle control transistors Tvc2 provided in a first light emitting area EA1 among the light emitting areas illustrated in FIG. 14 can be connected to a first viewing angle control line VCL1 to which a first viewing angle control signal VCS1 is supplied. Also, gates of the first viewing angle control transistors Tve1 and gates of the second viewing angle control transistors Tvc2 provided in a second light emitting area EA2 among the light emitting areas can be connected to a second viewing angle control line VCL2 to which a second viewing angle control signal VCS2 is supplied. Moreover, gates of the first viewing angle control transistors Tve1 and gates of the second viewing angle control transistors Tvc2 provided in a 12th light emitting area EA12 among the light emitting areas can be connected to a 12th viewing angle control line VCL12 to which a 12th viewing angle control signal VCS12 is supplied.

Further, the first viewing angle control line VCL1 to the 12th viewing angle control line VCL12 can be connected to the control driver 400 which generates the first viewing angle control signal VCS1 to the 12th viewing angle control signal VCS12.

Particularly, the first viewing angle control line VCL1 to the 12th viewing angle control line VCL12 can be connected to a first viewing angle control signal generator 701 to a 12th viewing angle control signal generator 712 provided in the control signal generator 420 of the control driver 400, as illustrated in FIG. 14. That is, the first viewing angle control signal generator 701 to the 12th viewing angle control signal generator 712 can generate the first viewing angle control signal VCS1 to the 12th viewing angle control signal VCS12.

Accordingly, each of the light emitting areas EA1 to EDA12 can be driven independently and can be dynamically configured or readjusted to operate in either the share mode or the privacy mode. For example, the subpixels P provided in the first light emitting area EA1 can be driven by the first viewing angle control signal VCS1, and the subpixels P provided in the second light emitting area EA2 can be driven by the second viewing angle control signal VCS2, and the subpixels P provided in the 12th light emitting area EA12 can be driven by the 12th viewing angle control signal VCS12.

First, after a vehicle is started and the vehicle is driven by a driver, a vehicle operation information signal can be transmitted from the external system 600 to the control driver 400.

In this situation, a first viewing angle control signal generator 701 to a 6th viewing angle control signal generator 706 can generate a first viewing angle control signal VCS1 to a 6th viewing angle control signal VCS6 having the high level. The first viewing angle control signal VCS1 to the 6th viewing angle control signal VCS6 can be transmitted through a first viewing angle control line VCL1 to a sixth viewing angle control line VCL6 to a first light emitting area EA1 to a sixth light emitting area EA6.

Subpixels P provided in the first to 6th light emitting areas EA1 to EA6 can be provided with first viewing angle control transistors Tvc1 and second viewing angle control transistors Tvc2 connected to the first viewing angle control line VCL1 to the 6th viewing angle control line VCL6. In this situation, as illustrated in FIG. 2, the first viewing angle control transistors Tvc1 can be N-type transistors, and the second viewing angle control transistors Tvc2 can be P-type transistors.

Accordingly, in the subpixels P provided in the first to 6th light emitting areas EA1 to EA6, only the first viewing angle control transistors Tvc1 can be turned on and the second viewing angle control transistors Tvc2 can be turned off by the first viewing angle control signal VCS1 to the 6th viewing angle control signals VCS6 having the high level (e.g., to operate the first to 6th light emitting areas EA1 to EA6 in the share mode with the wide viewing angle).

Accordingly, in the first to 6th light emitting areas EA1 to EA6, as illustrated in FIG. 7A, the first image having the wide viewing angle in the left-right direction, for example, the vehicle operation information image, can be displayed through the first light emitting units LU1. Accordingly, both a driver and a passenger can see the vehicle operation information image.

In other words, while a vehicle is operated, the vehicle operation information image IM1 should be necessary displayed, and particularly, the vehicle operation information image IM1 can have the first viewing angle, for example, the wide viewing angle, so that it can be seen by both a driver and a passenger.

Next, while a vehicle is being operated by a driver, if a television, radio, internet, or file playback program is selected by a driver or a passenger, a general image signal can be transmitted from the external system 600 to the control driver 400.

In this situation, a 7th viewing angle control signal generator 707 to a 12th viewing angle control signal generator 712 can generate a 7th viewing angle control signal VCS7 to a 12th viewing angle control signal VCS12 having the low level. The 7th viewing angle control signal VCS7 to the 12th viewing angle control signal VCS12 can be transmitted to a 7th to 12th light emitting area EA7 to EA12 through a 7th viewing angle control line VCL7 to a 12th viewing angle control line VCL12.

Subpixels P provided in the 7th to 12th light emitting areas EA7 to EA12 can be provided with first viewing angle control transistors Tvc1 and second viewing angle control transistors Tvc2 connected to the 7th viewing angle control line VCL7 to the 12th viewing angle control line VCL12. In this situation, as illustrated in FIG. 2, the first viewing angle control transistors Tvc1 can be N-type transistors, and the second viewing angle control transistors Tvc2 can be P-type transistors.

Accordingly, in the subpixels P provided in the 7th to 12th light emitting areas EA7 to EA12, only the second viewing angle control transistors Tvc2 can be turned on and the first viewing angle control transistors Tvc1 can be turned off by the 7th viewing angle control signal VCS7 to the 12th viewing angle control signals VCS12 having the low level (e.g., to operate 7th to 12th light emitting areas EA7 to EA12 in the privacy mode with the narrow viewing angle).

Accordingly, in the 7th to 12th light emitting areas EA7 to EA12, as illustrated in FIG. 7A, the second image having the narrow viewing angle in the left-right direction, for example, the general image, can be displayed through the second light emitting units LU2. Accordingly, only a passenger can see the general image.

In other words, while a vehicle is being operated or during driving, the general image IM2 which may disturb or distract a driver can have the second viewing angle, for example, the narrow viewing angle, so that it can be seen by only a passenger.

Next, if a vehicle is not operated or is stopped in a parking mode, an operation stop signal can be transmitted from the external system 600 to the control driver 400.

In this situation, if the entire screen of a light emitting display panel 100 is converted to a screen for viewing the general image IM2 by a user's selection or by an automatic function of the control driver 400, the first viewing angle control signal generator 701 to the 12th viewing angle control signal generator 712 can generate the first viewing angle control signal VCS1 to the 12th viewing angle control signal VCS12 having the high level. The first viewing angle control signal VCS1 to the 12th viewing angle control signal VCS12 can be transmitted through the first viewing angle control line VCL1 to the 12th viewing angle control line VCL12 to the first light emitting area EA1 to the 12th light emitting area EA12.

Accordingly, in the subpixels P provided in the first to 12th light emitting areas EA1 to EA12, only the first viewing angle control transistors Tve1 can be turned on and the second viewing angle control transistors Tvc2 can be turned off by the first viewing angle control signal VCS1 to the 12th viewing angle control signal VCS12 having the high level.

Therefore, in the first to 12th light emitting areas EA1 to EA12, as illustrated in FIG. 7B, the second image IM2 having the wide viewing angle in the left-right direction, for example, the general normal image, can be displayed through the first light emitting units LU1. Accordingly, both a driver and a passenger can see the general image (e.g., both the driver and the passenger can enjoy watching a same movie, streaming video, etc.).

In other words, while a vehicle is operated, the general image IM2 may disturb or distract a driver. However, while a vehicle is not being operated or is stopped in a parking mode, there is little chance of an accident occurring due to the general image IM2. Therefore, when a vehicle is not operated or is stopped in a parking mode, as illustrated in FIG. 7B, the general image IM2 having the first viewing angle, for example, the wide viewing angle, can be displayed through the entire light emitting display panel 100.

To provide an additional description, in a light emitting display apparatus according to the present disclosure, each of the light emitting areas EA1 to EA12 can output an image having the wide viewing angle, or can output an image having the narrow viewing angle.

Further, in a light emitting display apparatus according to the present disclosure, the same type of image (e.g., the general image IM2) can have the narrow viewing angle or the wide viewing angle depending on a driving mode of a vehicle, user selection, etc.

Next, while a vehicle is being operated by a driver or is currently moving, if the third image IM3, for example, the vehicle operation information auxiliary image such as navigation, is selected by a driver or a passenger, a vehicle operation information auxiliary signal can be transmitted to the control driver 400 from the external system 600.

If the vehicle operation information auxiliary signal is transmitted from the external system 600 to the control driver 400 and the vehicle operation information auxiliary image IM3 is set to be displayed in 7th to 9th light emitting areas EA7 to EA9, as illustrated in FIG. 7C, 7th to 9th viewing angle control signal generator 707 to 709 can transmit 7th to 9th viewing angle control signals VCS7 to VCS9 having the high level to the 7th to 9th light emitting areas EA7 to EA9.

Accordingly, in the 7th to 9th light emitting areas EA7 to EA9, the third image IM3 having the wide viewing angle in the left-right direction, for example, the vehicle operation information auxiliary image, can be displayed through the first light emitting units LU1, as illustrated in FIG. 7C. Therefore, both a driver and a passenger can see the vehicle operation information auxiliary image.

In other words, while a vehicle is being operated or while the vehicle is moving, the vehicle operation information auxiliary image IM3 is an image beneficial to both a driver and a passenger, and thus, the vehicle operation information auxiliary image IM3 can have the first viewing angle, for example, the wide viewing angle, so that it can be seen by both a driver and a passenger.

Further, If the vehicle operation information auxiliary signal is transmitted from the external system 600 to the control driver 400 and the vehicle operation information auxiliary image IM3 is set to be displayed in a 7th light emitting area EA7 and a 10th light emitting areas EA10, as illustrated in FIG. 7D, a 7th viewing angle control signal generator 707 and a 10th viewing angle control signal generator 710 can transmit a 7th viewing angle control signal VCS7 and a 10th viewing angle control signals VCS10 having the high level to the 7th light emitting area EA7 and the 10th light emitting area EA10.

Accordingly, in the 7th light emitting area EA7 and the 10th light emitting areas EA10, the third image IM3 having the wide viewing angle in the left-right direction, for example, the vehicle operation information auxiliary image, can be displayed through the first light emitting units LU1, as illustrated in FIG. 7D. Therefore, both a driver and a passenger can see the vehicle operation information auxiliary image.

In other words, while a vehicle is being operated or while the vehicle is moving, the vehicle operation information auxiliary image IM3 is an image beneficial to both a driver and a passenger, and thus, the vehicle operation information auxiliary image IM3 can have the first viewing angle, for example, the wide viewing angle, so that it can be seen by both a driver and a passenger.

Particularly, in a light emitting display apparatus according to the present disclosure, as illustrated in FIGS. 7C and 7D, a position where the image with the first viewing angle is output and a position where the image with the second viewing angle is output can be changed not only along the first direction X but also along the second direction Y.

That is, according to a light emitting display apparatus according to the present disclosure, the position where the image with the first viewing angle is output and the position where the image with the second viewing angle is output can be freely changed. Therefore, a driver or a passenger can freely change the position where the image with the first viewing angle is output and the position where the image with the second viewing angle is output.

For example, a driver or a passenger can set the area illustrated in FIG. 7C (e.g., the 7th light emitting area EA7 to the 9th light emitting area EA9) or the area illustrated in FIG. 7D (e.g., the 7th light emitting area EA7 and the 10th light emitting area EA10) to the position where the vehicle operation information auxiliary image IM3 such as navigation is output, by using the external system 600.

However, a position where an image affecting the safe driving, like the vehicle operation information image IM1, is output can be fixed at a specific area (e.g., the first to 6th light emitting areas EA1 to EA6) by the external system 600 or the control driver 400.

Finally, while a vehicle is operated by a driver or a vehicle is not operated or stopped in a parking mode, if the emergency information image IM4 is received, an emergency information signal can be transmitted to the control driver 400 from the external system 600.

For example, when the emergency information signal is received, an 8th viewing angle control signal generator 708 can generate an 8th viewing angle control signal VCS8 having the high level. The 8th viewing angle control signal VCS8 can be transmitted to an 8th light emitting area EA8 through an eighth viewing angle control line VCL8.

Accordingly, in the subpixels P provided in the 8th light emitting area EA8, only the first viewing angle control transistors Tvc1 can be turned on and the second viewing angle control transistors Tvc2 can be turned off by the 8th viewing angle control signal VCS8 having the high level.

Accordingly, in the 8th light emitting area EA8, as illustrated in FIG. 7E, the fourth image IM4 having the wide viewing angle in the left-right direction, for example, the emergency information image, can be displayed through the first light emitting units LU1 (e.g., share mode).

In other words, while a vehicle is being operated or while the vehicle is moving, the emergency information image IM4 is an image which needs to be viewed by not only a driver but also a passenger, and thus, the emergency information image IM4 can have the first viewing angle, for example, the wide viewing angle, so that it can be seen by both a driver and a passenger.

In this situation, the emergency information image IM4 can be displayed through any one of the light emitting areas where the general image IM2 having the second viewing angle (narrow viewing angle) is displayed, as illustrated in FIG. 7E.

However, as illustrated in FIGS. 7A and 7F, the emergency information image IM4 can be displayed through any one of the light emitting areas where the vehicle operation information image IM1 having the first viewing angle (e.g., wide viewing angle) is displayed.

That is, in a light emitting display apparatus according to the present disclosure, each of the light emitting areas (e.g., EA1 to EA12) can be driven independently, and thus, each of the light emitting areas (e.g., EA1 to EA12) can independently display an image having the first viewing angle (e.g., wide viewing angle) or an image having the second viewing angle (e.g., narrow viewing angle). Also, the user can select which areas should display content with the wide viewing angle (e.g., share mode) and which areas display content with the narrow viewing angle (e.g., privacy mode).

The features of the light emitting display apparatus according to an embodiment of the present disclosure are briefly summarized as follows.

A light emitting display panel according an embodiment of the present disclosure includes a display area provided with subpixels and a non-display area provided outside the display area, in which each of the subpixels includes a first light emitting unit driven by a first viewing angle control transistor and a second light emitting unit driven by a second viewing angle control transistor, a first lens provided in the first light emitting unit and a second lens provided in the second light emitting unit have different shapes, and a polarity type of the first viewing angle control transistor is different from a polarity type of the second viewing angle control transistor.

When the first viewing angle control transistor is an N-type transistor, the second viewing angle control transistor is a P-type transistor, and when the first viewing angle control transistor is a P-type transistor, the second viewing angle control transistor is an N-type transistor.

The first viewing angle control transistor is connected between the first light emitting unit and a driving transistor which controls the magnitude of current supplied to the first light emitting unit or the second light emitting unit, and the second viewing angle control transistor is connected between the driving transistor and the second light emitting unit.

The first light emitting unit includes a first light emitting device driven by the first viewing angle control transistor and a first lens disposed on the first light emitting device, and the second light emitting unit includes a second light emitting device driven by the second viewing angle control transistor and a second lens disposed on the second light emitting device.

The display area is divided into at least two light emitting areas along a first direction, the display area is divided into at least two light emitting areas along a second direction different from the first direction, gates of first viewing angle control transistors and second viewing angle control transistors provided in an sth light emitting area among the light emitting areas are connected to an sth viewing angle control line to which an sth viewing angle control signal is supplied (s is a natural number less than the number of the light emitting areas), and gates of first viewing angle control transistors and second viewing angle control transistors provided in an s+1th light emitting area among the light emitting areas are connected to an s+1th viewing angle control line to which an s+1th viewing angle control signal is supplied.

The sth viewing angle control line and the s+1th viewing angle control line are connected to a control driver generating the sth viewing angle control signal and the s+1th viewing angle control signal.

A light emitting display apparatus according to an embodiment of the present disclosure includes a display area provided with subpixels and a non-display area provided outside the display area, in which each of the subpixels includes a first light emitting unit driven by a first viewing angle control transistor and a second light emitting unit driven by a second viewing angle control transistor, a first viewing angle of a light output from the first light emitting unit is different from a second viewing angle of a light output from the second light emitting unit, the display area is divided into at least two light emitting areas along a first direction, the display area is divided into at least two light emitting areas along a second direction different from the first direction, and only first light emitting units or only second light emitting units are driven in each of the light emitting areas.

The first viewing angle control transistor is connected between the first light emitting unit and a driving transistor which controls the magnitude of current supplied to the first light emitting unit or the second light emitting unit, and the second viewing angle control transistor is connected between the driving transistor and the second light emitting unit.

Each of the light emitting areas is independently driven.

When the first viewing angle control transistor is an N-type transistor, the second viewing angle control transistor is a P-type transistor, and when the first viewing angle control transistor is a P-type transistor, the second viewing angle control transistor is an N-type transistor.

When the first viewing angle control transistor is turned on, the second viewing angle control transistor is turned off, and when the first viewing angle control transistor is turned off, the second viewing angle control transistor is turned on.

The first light emitting unit includes a first light emitting device driven by the first viewing angle control transistor and a first lens disposed on the first light emitting device, and the second light emitting unit includes a second light emitting device driven by the second viewing angle control transistor and a second lens disposed on the second light emitting device.

A viewing angle of a light output from the first light emitting device through the first lens and ac viewing angle of a light output from the second light emitting device through the second lens are different from each other.

Gates of first viewing angle control transistors and second viewing angle control transistors provided in an sth light emitting area among the light emitting areas are connected to an sth viewing angle control line to which an sth viewing angle control signal is supplied (s is a natural number less than the number of the light emitting areas), and gates of first viewing angle control transistors and second viewing angle control transistors provided in an s+1th light emitting area among the light emitting areas are connected to an s+1th viewing angle control line to which an s+1th viewing angle control signal is supplied.

The sth viewing angle control line and the s+1th viewing angle control line are connected to a control driver which generates the sth viewing angle control signal and the s+1th viewing angle control signal.

The light emitting display panel and the light emitting display apparatus according to the present disclosure can be applied to all electronic devices including a light emitting display panel. For example, the light emitting display apparatus according to the present disclosure can be applied to a virtual reality (VR) device, an augmented reality (AR) device, a mobile device, a video phone, a smart watch, a watch phone, a wearable device, foldable device, rollable device, bendable device, flexible device, curved device, electronic notebook, e-book, PMP (portable multimedia player), PDA (personal digital assistant), MP3 player, mobile medical device, desktop PC, laptop PC, netbook computer, workstation, navigation, vehicle navigation, vehicle display devices, televisions, wallpaper display devices, signage devices, game devices, laptops, monitors, cameras, camcorders, and home appliances.

According to a light emitting display apparatus according to an embodiment of the present disclosure, in each of light emitting areas provided along a first direction of a light emitting display panel and light emitting areas provided along a second direction different from the first direction, only first light emitting units can be driven or only second light emitting units can be driven, and thus, only lights having a first viewing angle can be output or only lights having a second viewing angle can be output.

Particularly, a viewing angle of light output from each of the light emitting areas can be changed to the first viewing angle or the second viewing angle, based on the type of image output from each of the light emitting areas.

Further, the viewing angle of light output from each of the light emitting areas can be changed to the first viewing angle or the second viewing angle based on the user's request.

Therefore, according to the light emitting display apparatus according to an embodiment of the present disclosure, a viewing angle of each of the light emitting areas provided along the first and second directions of the light emitting display panel can be changed, and thus, the type of image output from each of the light emitting areas can be freely changed. Accordingly, users can easily and quickly recognize images which they need, through the light emitting display apparatus.

The above-described feature, structure, and effect of the present disclosure are included in at least one embodiment of the present disclosure, but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the present disclosure.

What is claimed is:

1. A light emitting display panel comprising:

a display area including subpixels and a non-display area outside of the display area, wherein each of the subpixels includes:

a driving transistor configured to supply a driving current;

a first light emitting unit configured to be driven by a first viewing angle control transistor; and a second light emitting unit configured to be driven by a second viewing angle control transistor, wherein a shape of a first lens included in the first light emitting unit is different than a shape of a second lens included in the second light emitting unit, wherein a polarity type of the first viewing angle control transistor is different than a polarity type of the second viewing angle control transistor, wherein a first gate of the first viewing angle control transistor and a second gate of the second viewing angle control transistor are configured to receive a same viewing angle control signal to selectively control the supply of the driving current from the driving transistor to the first and second light emitting units, respectively, by turning one of the first and second viewing angle control transistors on while another one of the first and second viewing angle control transistors is turned off, wherein the display area is divided into a first portion and a second portion, wherein a first group of subpixels corresponding to the first portion are configured to display a first image with a wide viewing angle while a second group of subpixels corresponding to the second portion are configured to display a second image with a narrow viewing angle, wherein at least three sides of the first portion displaying the first image with the wide viewing angle are surrounded by the second portion displaying the second image with the narrow viewing angle, and wherein first image displayed in the first portion corresponds to a warning or notification while the second image displayed in the second portion corresponds to entertainment content.

2. The light emitting display panel of claim 1, wherein the first viewing angle control transistor is an N-type transistor, and the second viewing angle control transistor is a P-type transistor, or wherein the first viewing angle control transistor is a P-type transistor, and the second viewing angle control transistor is an N-type transistor.

3. The light emitting display panel of claim 1, wherein the first viewing angle control transistor is connected between the first light emitting unit and the driving transistor configured to control a magnitude of the driving current supplied to the first light emitting unit or the second light emitting unit, and wherein the second viewing angle control transistor is connected between the driving transistor and the second light emitting unit.

4. The light emitting display panel of claim 1, wherein the first light emitting unit includes:

a first light emitting device configured to be driven by the first viewing angle control transistor; and the first lens disposed on the first light emitting device, and wherein the second light emitting unit includes:

a second light emitting device configured to be driven by the second viewing angle control transistor; and the second lens disposed on the second light emitting device.

5. The light emitting display panel of claim 1, wherein the display area is divided into light emitting areas including at least two light emitting areas disposed along a first direction and at least two light emitting areas disposed along a second direction different than the first direction, wherein gates of first viewing angle control transistors and second viewing angle control transistors in an sth light emitting area among the light emitting areas are connected to an sth viewing angle control line configured to receive an sth viewing angle control signal, wherein s is a natural number less than a number of the light emitting areas, and wherein gates of first viewing angle control transistors and second viewing angle control transistors in an s+1th light emitting area among the light emitting areas are connected to an s+1th viewing angle control line configured to receive an s+1th viewing angle control signal.

6. The light emitting display panel of claim 5, wherein the sth viewing angle control line and the s+1th viewing angle control line are connected to a control driver configured to generate the sth viewing angle control signal and the s+1th viewing angle control signal.

7. A light emitting display apparatus comprising:

a display area including subpixels and a non-display area outside of the display area, wherein each of the subpixels includes:

a driving transistor configured to supply a driving current;

a first light emitting unit configured to be driven by a first viewing angle control transistor; and a second light emitting unit configured to be driven by a second viewing angle control transistor, wherein a first viewing angle of a light output from the first light emitting unit is different than a second viewing angle of a light output from the second light emitting unit, wherein the display area is divided into light emitting areas including at least two light emitting areas disposed along a first direction and at least two light emitting areas disposed along a second direction different than the first direction, wherein the light emitting areas are configured to selectively emit light via only first light emitting units or via only second light emitting units, wherein a polarity type of the first viewing angle control transistor is different than a polarity type of the second viewing angle control transistor, wherein a first gate of the first viewing angle control transistor and a second gate of the second viewing angle control transistor are configured to receive a same viewing angle control signal to selectively control the supply of the driving current from the driving transistor to the first and second light emitting units, respectively, by turning one of the first and second viewing angle control transistors on while another one of the first and second viewing angle control transistors is turned off, wherein the display area is divided into a first portion and a second portion, wherein a first group of subpixels corresponding to the first portion are configured to display a first image with a wide viewing angle while a second group of subpixels corresponding to the second portion are configured to display a second image with a narrow viewing angle, wherein at least three sides of the first portion displaying the first image with the wide viewing angle are surrounded by the second portion displaying the second image with the narrow viewing angle, and wherein first image displayed in the first portion corresponds to a warning or notification while the second image displayed in the second portion corresponds to entertainment content.

8. The light emitting display apparatus of claim 7, wherein the first viewing angle control transistor is connected between the first light emitting unit and the driving transistor configured to control a magnitude of the driving current supplied to the first light emitting unit or the second light emitting unit, and wherein the second viewing angle control transistor is connected between the driving transistor and the second light emitting unit.

9. The light emitting display apparatus of claim 7, wherein each of the light emitting areas is configured to be independently driven.

10. The light emitting display apparatus of claim 7, wherein the first viewing angle control transistor is an N-type transistor, and the second viewing angle control transistor is a P-type transistor, or wherein the first viewing angle control transistor is a P-type transistor, and the second viewing angle control transistor is an N-type transistor.

11. The light emitting display apparatus of claim 7, wherein when the first viewing angle control transistor is turned on, the second viewing angle control transistor is turned off, and wherein when the first viewing angle control transistor is turned off, the second viewing angle control transistor is turned on.

12. The light emitting display apparatus of claim 7, wherein the first light emitting unit includes:

a first light emitting device configured to be driven by the first viewing angle control transistor; and a first lens disposed on the first light emitting device, and wherein the second light emitting unit includes:

a second light emitting device configured to be driven by the second viewing angle control transistor; and a second lens disposed on the second light emitting device.

13. The light emitting display apparatus of claim 12, wherein a viewing angle of a light output from the first light emitting device through the first lens and a viewing angle of a light output from the second light emitting device through the second lens are different from each other.

14. The light emitting display apparatus of claim 7, wherein gates of first viewing angle control transistors and second viewing angle control transistors in an sth light emitting area among the light emitting areas are connected to an sth viewing angle control line configured to receive an sth viewing angle control signal, wherein s is a natural number less than the number of the light emitting areas, and wherein gates of first viewing angle control transistors and second viewing angle control transistors in an s+1th light emitting area among the light emitting areas are connected to an s+1th viewing angle control line configured to receive an s+1th viewing angle control signal.

15. The light emitting display apparatus of claim 14, wherein the sth viewing angle control line and the s+1th viewing angle control line are connected to a control driver configured to generate the sth viewing angle control signal and the s+1th viewing angle control signal.

16. A display device comprising:

a display panel divided into a plurality of light emitting areas, each of the plurality of light emitting areas including a plurality of first type subpixels each including a first light emitting element configured to emit a color light with a wide viewing angle based on control by a first viewing angle control transistor, and a plurality of second type subpixels each including a second light emitting element configured to emit the color light with a narrow viewing angle smaller than the wide viewing angle based on control by a second viewing angle control transistor, the first light emitting element and the second light emitting element being configured to receive a driving current from a same driving transistor; and a controller configured to:

activate the plurality of second type subpixels within at least one of the plurality of light emitting areas to display first content with the narrow viewing angle while the plurality of first type subpixels within the at least one of the plurality of light emitting areas remain off based on a same viewing angle control signal, activate the plurality of first type subpixels within remaining light emitting areas among the plurality of light emitting areas to display second content with the wide viewing angle while the plurality of second type subpixels within the remaining light emitting areas remain off based on the same viewing angle control signal, wherein a first gate of the first viewing angle control transistor and a second gate of the viewing angle control transistor are configured to receive the same viewing angle control signal to selectively control supply of the driving current from the same driving transistor to the first and second light emitting elements, respectively, by turning one of the first and second viewing angle control transistors on and another one of the first and second viewing angle control transistors off, wherein the display panel is divided into a first portion and a second portion, wherein a first group of subpixels corresponding to the first portion are configured to display a first image with a wide viewing angle while a second group of subpixels corresponding to the second portion are configured to display a second image with a narrow viewing angle, wherein at least three sides of the first portion displaying the first image with the wide viewing angle are surrounded by the second portion displaying the second image with the narrow viewing angle, and wherein first image displayed in the first portion corresponds to a warning or notification while the second image displayed in the second portion corresponds to entertainment content.

17. The display device of claim 16, further comprising:

a plurality of semi-cylindrical shaped lenses respectively disposed on the plurality of first type subpixels in each of the plurality of light emitting areas; and a plurality of hemispherical shaped lenses respectively disposed on the plurality of second type subpixels in each of the plurality of light emitting areas.

18. The display device of claim 16, further comprising:

a first viewing angle control transistor connected to the first light emitting element; and a second viewing angle control transistor connected to the second light emitting element, wherein a gate of the first viewing angle control transistor and a gate of second viewing angle control transistor are both connected to a same viewing angle control line.

19. The display device of claim 16, wherein the controller is further configured to:

selectively control the plurality of light emitting areas to operate in a share mode corresponding to the wide viewing angle or a privacy mode corresponding to the narrow viewing angle on a light emitting area by light emitting area basis.

20. The display device of claim 19, wherein the plurality of light emitting areas are arranged in a grid including at least two rows and at least two columns.

21. The display device of claim 19, wherein the controller is further configured to:

in response to a user input, transition one of the plurality of light emitting areas from displaying content in the share mode with the wide viewing angle to displaying content in the privacy mode with the narrow viewing angle.

* * * * *